United States Patent
Gamay

(10) Patent No.: US 11,272,712 B2
(45) Date of Patent: Mar. 15, 2022

(54) PASTEURISED SHELF STABLE BATTER

(71) Applicant: Aly Gamay, McLean, VA (US)

(72) Inventor: Aly Gamay, McLean, VA (US)

(73) Assignee: Aly Gamay, McLean, VA (US)

( * ) Notice: Subject to any disclaimer, the term of this patent is extended or adjusted under 35 U.S.C. 154(b) by 101 days.

(21) Appl. No.: 16/282,226

(22) Filed: Feb. 21, 2019

(65) Prior Publication Data
US 2019/0254293 A1    Aug. 22, 2019

Related U.S. Application Data

(60) Provisional application No. 62/633,252, filed on Feb. 21, 2018.

(51) Int. Cl.
| | | |
|---|---|---|
| *A21D 10/04* | (2006.01) |
| *A21D 2/02* | (2006.01) |
| *A21D 8/04* | (2006.01) |
| *A21D 2/16* | (2006.01) |
| *A21D 2/18* | (2006.01) |
| *B65D 85/60* | (2006.01) |
| *A21D 6/00* | (2006.01) |
| *A21D 13/80* | (2017.01) |
| *B65D 51/28* | (2006.01) |
| *B65D 75/00* | (2006.01) |
| *B65D 75/58* | (2006.01) |

(52) U.S. Cl.
CPC .......... *A21D 10/045* (2013.01); *A21D 2/02* (2013.01); *A21D 2/16* (2013.01); *A21D 2/18* (2013.01); *A21D 2/181* (2013.01); *A21D 2/186* (2013.01); *A21D 2/188* (2013.01); *A21D 6/003* (2013.01); *A21D 8/045* (2013.01); *A21D 13/80* (2017.01); *B65D 51/28* (2013.01); *B65D 75/008* (2013.01); *B65D 75/5883* (2013.01); *B65D 85/60* (2013.01)

(58) Field of Classification Search
CPC ........ A21D 10/045; A21D 2/188; A21D 2/16; A21D 2/18; A21D 2/181; A21D 2/186; A21D 6/003; A21D 8/045; B65D 51/28; B65D 85/60
USPC .................................................. 426/18, 551
See application file for complete search history.

(56) References Cited

U.S. PATENT DOCUMENTS

| | | | | |
|---|---|---|---|---|
| 2,810,650 A | * | 10/1957 | Joslin ...................... | A21D 6/001 426/551 |
| 4,375,484 A | * | 3/1983 | Lee .......................... | A23P 20/12 426/293 |
| 6,787,175 B2 | * | 9/2004 | Pedrick ................ | A21D 10/045 426/128 |
| 2004/0151809 A1 | * | 8/2004 | Schierioth .............. | A21D 2/185 426/94 |

FOREIGN PATENT DOCUMENTS

EP            0868850 A1 * 10/1998 ............... A21D 8/02

* cited by examiner

*Primary Examiner* — Hamid R Badr
(74) *Attorney, Agent, or Firm* — Bio Intellectual Propery Services LLC; O. (Sam) Zaghmout

(57) ABSTRACT

The disclosed subject matter provides batter compositions, food package kits comprising batter compositions, and methods of preparing such batter compositions and kits.

46 Claims, 3 Drawing Sheets

PASTEURISED SHELF STABLE BATTER

PRIORITY

This application claims priority to U.S. Provisional Application No. 62/633,252, filed Feb. 21, 2018, the entire disclosure of which is hereby incorporated by reference.

FIELD OF INVENTION

Disclosed are pasteurized, shelf stable batters, ready-to-cook on hot surfaces or in microwave or conventional ovens to produce in seconds to minutes ferinaceous breakfast, snack, and dessert type foods including pancakes, cakes, brownies, muffins, and cookies. Also disclosed are food package kits comprising such batters and methods for preparing such batters and kits.

BACKGROUND

Baked goods such as muffins, pancakes, cakes, brownies, and the like are popular consumer snack food and dessert food items. They are typically made from scratch or from a dry mix, where consumers make a batter by adding liquids to dry ingredients and then bake the batter soon after mixing. While these methods can produce high quality baked goods, preparation of the batters can be time consuming and messy. Additionally, the batter should be used by the consumer immediately to provide for optimum leavening action because the batters are not microbiologically stable. For example, dry pancake mixes are very popular due to their convenience and have become a food staple. A consumer combines a desired portion of a packaged dry pancake mix with water and optionally oil or eggs to produce a batter that takes the form of an aqueous mixture that can be poured or ladled onto a cooking surface to make a pancake. The mixture has desired rheology, including a low yield point, which allows the batter to flow and be poured onto a cooking surface. The batter also has leavening properties that result in expected volume of the cooked pancake. The abovementioned features are expected by consumers and any new convenient product should adhere to those features in order to gain acceptability by consumers. The disadvantage of the homemade batter is that the mixture must be used in totality soon after its preparation because it is not sufficiently stable to be stored and used at a later time. For example, the batter may phase separate. In addition, the batter typically has a high water activity, e.g., 0.97 or higher, making it susceptible to microbial growth and spoilage.

When most of the ingredients are mixed together, the concept is called "all-in-one" recipe. The addition of water, fat, sugar and eggs may be required. Preparing the mix immediately before cooking may often be inconvenient but if not cooked immediately, the mix is highly susceptible to bacterial infection. It could undergo physical and possibly chemical changes on standing which result in an inferior cooked item.

Current trends for consumer package food products favor products of greater convenience, including "ready-to-bake" products such as frozen batters. While overcoming some of the issues with homemade batters, frozen batters require the consumer to thaw the batter prior to baking, a time-consuming step. Moreover, the refrigerated storage life of the thawed batter is typically short. If the entire batch is not used relatively quickly, there is a risk that the unused portion of the batter will spoil and be wasted.

In addition to frozen batters, premixed refrigerated doughs, such as bread dough, cookie dough, and the like have been developed. These doughs typically need to be hermetically sealed, stored under pressure and/or placed in modified atmosphere packaging (MAP) in order to provide good shelf stability properties under refrigerated storage conditions. As a result, after the consumer opens the packaging for initial use of the product, the refrigerated dough cannot be stored for long periods of time thereafter. Refrigerated ready-to-bake batters face similarly short shelf lives. In addition to being susceptible to bacterial growth, such products fail to provide a leavening system that retains functionality over extended storage.

To improve ambient or refrigerated storage properties, batters may be processed by heat, freezing, high or low pressure to inactivate or kill microbes, spores, and other biologically active species such as bacteria, fungi, enzymes, proteins, yeast, molds, etc. For example, batters may be subjected to pasteurization processes involving elevated temperature conditions for a time to reduce or eliminate active or potentially active microbes or spores in a food product. Freezing, high pressure, vacuum processing, concentrated inert gas, and low oxygen headspace atmospheres may also be used for similar purposes. These processing steps, while often effective and useful, can significantly add to the cost of commercial food products, and are preferably avoided if other means of improving storage can be effective.

While pasteurization is an effective method for extending food shelf life, major problems caused by exposing a batter mixture to high temperatures can arise. When reaching a temperature of approximately 55° C. or higher the batter can stiffen and become unpourable, making it unsuitable for use in the manufacture of the desired products as well as difficult to handle by consumers. However, if heated to temperatures below 55° C., not every pathogenic micro-organism, such as bacteria, mold and/or yeast will die, in which case the batter composition may be susceptible to bacterial infection and may undergo physical and possibly chemical changes while stored, which may lead to a poor batter and thus poor cooked product. A low water activity level coupled with pasteurization as shown in the current invention may overcome this concern.

Acidifying the batter desirably extends bacterial stability but the acidity can leave an undesirable acid aftertaste and tends to interact with the leavening system such that the finished baked goods exhibit undesirable volume and poor texture.

In recent years, intermediate moisture foods with reduced availability of water have been introduced to reduce microbial growth and lengthen shelf life. Such availability of water in the food is commonly termed "water activity" ($A_w$). In general, a low $A_w$ of the food product (under 0.90) indicates the existence of an environment in which most bacteria will not generally grow. Under refrigerated conditions, such as 40° F., the maximum A, inhibitory to most bacteria is 0.95.

In general, an increase in the moisture level of many foods will increase their palatability. However, elevating the moisture level of foods above 10 percent leads to microbiological decomposition unless such foods are packaged in a hermetically sealed container and commercially sterilized or maintained in a frozen or refrigerated state throughout the period of distribution and storage by the consumer. These packaging and preservation methods are expensive and inconvenient to the consumer.

One drawback to lowering $A_w$ is that high amounts of sugars and humectants are required which renders the finished product tasting overly sweet, especially if the batter is intended to be kept at ambient temperature, in addition to producing defective texture in the baked item. The current invention addresses that issue by combining several safety factors in a process that delivers high quality batters equivalent to homemade ones.

There is a need for an intermediate moisture pancake and cake batters that are microbiologically stable and pourable at room temperatures and can be stored for a long period of time at ambient temperature without the need for hermetic or pressurized sealing. The desired batter should be of reasonable sweetness and produces a baked product comparable to those obtained when the batter is made from scratch or a dry mix.

Recently, microwavable batters have become popular due to their ease and speed of preparation. Unfortunately, other than dry mixes that require the addition of water, there have been a lack of innovation in the area of non-refrigerated shelf stable products. Obviously, an easy to pour shelf stable batter that bakes in the microwave to a good quality finished product is highly needed by today's time pressed consumers. There have been particular problems with regard to using microwave ovens as a means for baking various products. For instance, the use of microwave energy does not produce a consistent texture throughout the interior portion of the baked item. In general, during microwave baking, the batter tends to collapse and also tends to have a poor, rubbery interior structure. When a cake batter is baked in a microwave oven, the outer edges become dry and tough while the center is not yet completely cooked. Further, the texture of the cake is not the same as if it had been baked in a convention oven. That is, a moist, light, uniform air cells texture is not produced. There are thus many problems that must be overcome when baking with a microwave oven rather than a conventional oven.

The present invention provides batters and doughs that shelf-stable, i.e., storage stable at ambient conditions. This feature enables the batters and doughs to be mass-marketed through supermarkets. Such batters and doughs need not be refrigerated or frozen, but rather may appear alongside other baked goods that are displayed at room temperature.

For time-pressed consumers, interest exists for a batter that is pre-made and ready-to-use containing water and all other dry and liquid ingredients and packaged for sale as a finished batter is which is pourable (e.g., poured or otherwise dispensed from a squeezable package) onto a cooking surface or placed in a microwave oven to be ready for consumption in a matter of seconds or minutes. Especially desired would be a ready-to-use packaged product that is contained in a re-sealable container that can be opened a first time (initially opened) by a consumer for utilization, then closed and stored at ambient temperature for later use over days or weeks after the consumer first opened the container. A successful consumer product would meet consumer expectations in terms of physical and performance properties of the batter throughout a reasonable storage period, and would not exhibit abnormal package appearance by bulging due to gas produced by leavening agents. While such as product is understandably desired, many technological challenges have not previously been overcome to allow a product to exist and perform in a manner comparable to a fresh batter product, over months of room temperature storage. No product of this type, that meets many all of these product features, has previously been described, developed, or shown to be feasible.

The present invention provides improved products of greater convenience and quality equal to fresh batter. The present invention provides articles comprising ready-to-use fluid and non-fluid batter and dough that are shelf stable at room temperatures and easy to dispense.

The present invention provides ready-to-bake batters either for microwavable articles that are shelf stable at room temperature, flowable and easy to bake in a microwave oven in a matter of seconds or suitable for baking in a conventional oven without any preparation or addition of ingredients.

SUMMARY

The inventive batter compositions are useful for preparing products conventionally produced from chemically-leavened flour-based batters (as defined under definitions). Baked or cooked products that can be prepared from the inventive batter compositions can include, for example, muffins, pancakes, brownies, cakes, coffee cakes, quick breads, corn breads, funnel cakes, and the like. Described is a method for preparing batters suitable for making single serve, individualized portions by squeezing the desired amount of shelf stable batter out of a squeezable bottle.

A no mess and quick cooking or baking could be done either on a hot surface or utilizing microwave energy as the source of heat for baking. The net result is that the consumer can quickly and easily produce hot, home-baked goods. Further, the inventive batters have an extended ambient temperature shelf life so that in stores, or at home, it need not be stored in a refrigerator or freezer. However, the batter could be refrigerated or frozen if desired. The present batter may comprise traditional baking components including flour, sugar, shortening, emulsifiers and chemical leavening agents. Other ingredients that it may contain are starches, milk powder, salt, gums and other ingredients as desired like flavorings and colors. The inventive batter does not require the inclusion of whole or white eggs.

Described herein are practical ready-to-cook batters. In some embodiments, no refrigeration or freezing is required, either after initial preparation; during transportation, storage, and sale to a consumer, or after an initial opening of the package and use of a portion of the batter by a consumer. The packaged product may be stable during room temperature storage for many months after the packaged batter product is initially prepared (filled and sealed). Additionally, in further embodiments, after the packaged product is initially opened by the consumer, a portion can be used, re-sealed, and stored at ambient temperature for weeks for use on multiple occasions without product spoilage or quality loss.

Storage stability can desirably include freshness of the batter without exhibiting dimensional instability in a package such as expanding during storage phenomenon. As part of the stability of the packaged product, the container headspace will not contain any appreciable amount of gas due to the inventive resilient formulation that controls premature gas production during storage.

In general, refrigerated batter products can be more difficult and less convenient for consumers to dispense due to high viscosity of the liquids. The current invention allows for control and adjustment of the composition's viscosity. Thus, if non-flowable batter is desired, the inventive method could be adapted to produce extrudable and formable products.

In some embodiments, the present invention provides methods comprising pasteurization and/or control of water activity to produce ambient temperature shelf stable batter mixes with microbiological stability for extended periods of time.

In further embodiments, the inventive batters may be stored at room temperature, and be pourable, flowable, and/or suitable for cooking or baking to yield finished products with a high degree of palatability and good texture.

In further embodiments, the current invention provides superior quality shelf stable batters having water activities between about 0.85 and 0.75, low viscosity, and capable of producing finished foods with high volume when cooked or baked.

In further embodiments, the subject invention provides superior quality pasteurized shelf stable batters that could be instantly cooked using microwave ovens, conventional ovens or hot surfaces.

In further embodiments, the subject invention produces ambient temperature stable batters that produce carbon dioxide during cooking or baking but not during storage.

In further embodiments, the subject invention provides methods of controlling viscosity of batter to produce thermally-treated shelf stable batters that could be utilized in various cooking applications such as in conventional ovens, in microwave ovens or on hot surfaces.

In further embodiments, the subject invention provides shelf stable batters that could be packaged in pouches, squeezable bottles, plastic containers and/or tubes to be used by consumers and food service establishments.

Other objects, features and advantages of the present invention will be apparent from this summary and the following descriptions, examples, embodiments, and claims to those skilled in the relevant art.

DEFINITIONS

Figure 1:
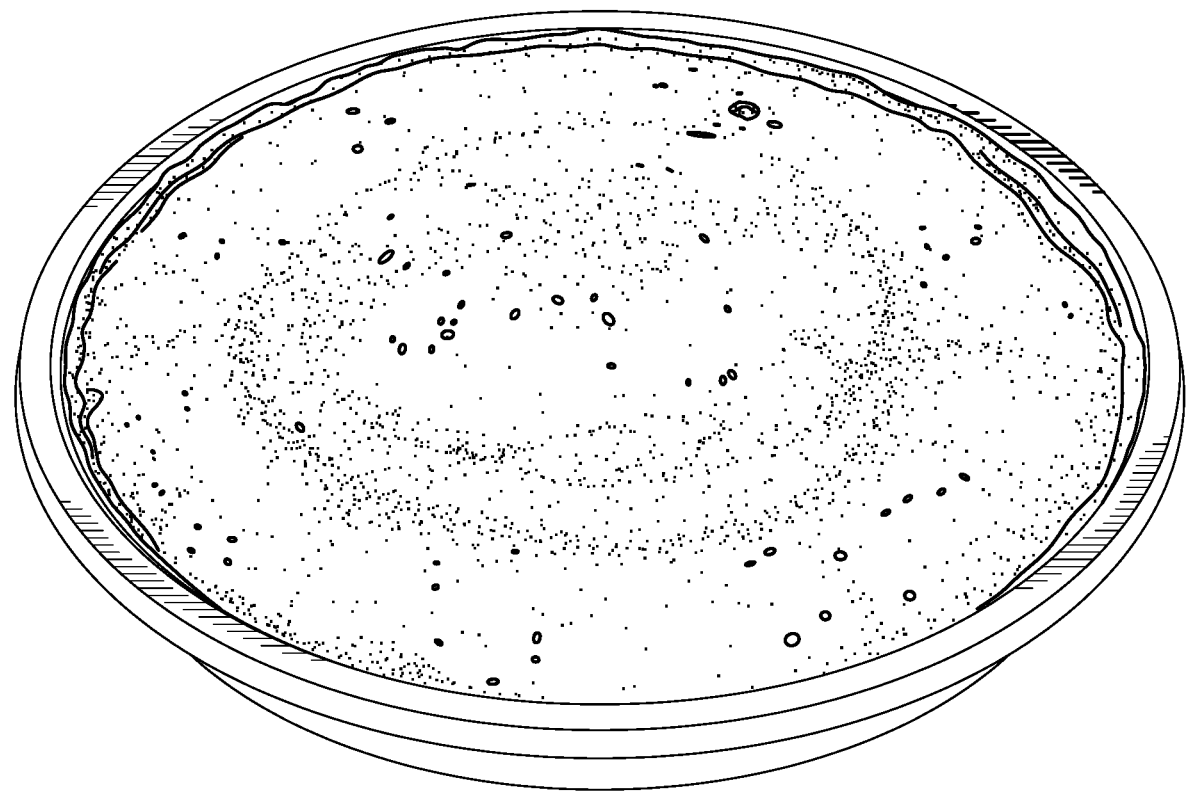
FIG. 1 illustrates a microwaved cake prepared according to Example 6.

Unless defined otherwise, all technical and scientific terms used herein have the same meaning as commonly understood by one of ordinary skill in the art to which this invention belongs. Still, certain elements are defined below for the sake of clarity and ease of reference.

"Shelf stable" means a food product that is microbiologically and chemically stable at ambient temperature (e.g., without the food product substantially breaking down by, for instance, microbial contamination, syneresis, or water accumulation) without refrigeration or freezing.

"Ambient" refers to a temperature in the range of about 65° F. to about 85° F.

"Low acid foods" means any foods other than alcoholic beverages, with a finished equilibrium pH greater than 4.6 and a water activity (a) greater than 0.85. Tomatoes and tomato products having a finished equilibrium pH less than 4.7 are not classified as low-acid foods.

The term "pH" is used to designate the intensity or degree of acidity. The value of pH, the logarithm of the reciprocal of the hydrogen ion concentration in solution, is usually determined by measuring the difference potential between two electrodes immersed in a sample solution.

The term "water activity level" is defined in the book "Food Science," Third Edition, A.V.I. (1984) as a qualitative measure of unbound free water in a system that is available to support biological and chemical reactions. In general, as the water activity of a given food product decreases, its shelf life increases. A high water activity ($A_w$) product becomes more susceptible to mold, fungus and bacterial proliferation. For instance, the FDA defines a low acid food product with a pH of greater than 4.6 as shelf stable only if it has a water activity of 0.85 or less. Two foods with the same water content can vary significantly in their water activity depending on how much free water is in the system. When a food is in moisture equilibrium with its environment, the water activity of the food will be quantitatively equal to the relative humidity in headspace of the container divided by 100.

The term "viscosity" which is the resistance to flow is mathematically defined as the shear stress divided by the rate of shear strain. Shear stress is the force acting in the plane of the fluid, and shear rate is the velocity gradient of the fluid between the plates. The shear rate takes into account the distance between the plates. It is defined in terms of the force required to move one plane surface continuously past another under specified steady-state conditions when the space between is filled by a specific liquid. Although absolute viscosity can be measured directly if accurate dimensions of the measuring instruments are known, it is more common to calibrate the instrument with a liquid of known viscosity (i.e., standard) and to determine the viscosity of the unknown fluid by comparison with that of the known. Foods exhibit different types of flow. In Newtonian materials, viscosity is not affected by changes in shear rate and remains constant. However, changes in shear rate do affect the viscosity of non-Newtonian materials.

"Food product" as used herein refers to food compositions in a ready-to-bake or ready-to-cook form.

The term "lipid emulsifiers" or "surfactants" mean substances that stabilize an emulsion by increasing its kinetic stability and are considered as surfactants or surface active agents. Surfactants are compounds that are amphipathic, having a hydrophilic, water interactive 'end', referred to as their 'head group', and a lipophilic 'end', usually a long chain hydrocarbon fragment, referred to as their 'tail'. They congregate at low energy surfaces, including the air-water interface (lowering surface tension) and the surfaces of the water-immiscible droplets found in emulsions (lowering interfacial tension). At these surfaces they naturally orient themselves with their head groups in water and their tails either sticking up and largely out of water (as at the air-water interface) or dissolved in the water-immiscible phase that the water is in contact with (e.g. as the emulsified oil droplet). In both these configurations the head groups strongly interact with water while the tails avoid all contact with water. Surfactant molecules also aggregate in water as micelles with their head groups sticking out and their tails bunched together. Micelles draw oily substances into their hydrophobic cores, explaining the basic action of soaps and detergents used for personal cleanliness and for laundering clothes. The term includes both lipophilic and lipophobic surfactants.

As used herein, the term "dough" refers to an intermediate food product containing flour and/or starch as the principle structuring ingredient. For example, a dough may contain gluten which forms a continuous elastic medium into which other ingredients can be embedded. A dough can be prepared by beating, blending, cutting, and/or kneading, and can be stiff enough to maintain a discrete shape and/or cut into various shapes at ambient temperature. Doughs can be used for low sugar-to-flour ratio products such as breads and biscuits, and sweeter products such as cookies and pie crusts.

The term "batter" is used herein in a broad sense to refer to not only any flour and/or starch containing intermediate food product that is flowable or pourable at ambient temperature, but to also include any farinaceous composition that is non-flowable or non-pourable at ambient temperature, such as dough. A batter may contain in addition to flour and/or starch, a liquid such as water, and optionally salt, fat, egg(s), and sweetener(s). In a batter, gluten development may be purposefully minimized and thus may be inelastic or less elastic than dough. Liquid added to make the batter form a continuous batter medium in which other ingredients can be dispersed. A batter may cook into a soft, moist and/or crumbly product. A batter can be prepared in the manner described above for dough or can be prepared by blending, creaming, stirring, and/or whipping. A batter can be as stiff as dough or can be less viscous than dough such that, for instance, it is flowable enough to pour or scoop or squeeze out of a container.

In some aspects, the batter compositions herein can be described as "ready-to-cook" or "ready-to-bake." In these aspects, the batter compositions are formulated as complete batters that can be placed into a cooking or baking environment without additional preparation steps or additional ingredients on the part of the consumer.

The inventive batter compositions can be stored at refrigeration and/or ambient temperatures. Reference to the general phrase "storage temperatures" herein will be understood to encompass ambient or refrigerated storage conditions.

"Enzyme-inactivated flour" refers to flour having substantially no alpha-amylase activity. In some embodiments, an enzyme-inactivated flour further has substantially zero lipase activity, substantially zero lipoxygenase activity, and/or peroxidase activity reduced by more than about 90%.

"Altered gelatinization starch" refers to a starch source on which altered-gelatinization protocol has been performed.

"Altered gelatinization protocol" (AGP) refers to a process which can be performed on a starch source to retard starch swelling at about 165° F. or below.

"Leavening source" includes any leavening agent that can cause expansion of batters by the release of gas, e.g., carbon dioxide. The leavening source may be natural or chemical. In some embodiments, the leavening source comprises at least one chemical leavening agent. The leavening source may be non-encapsulated or encapsulated by a degradable barrier material, such as lipid, to control or delay its reaction until, for instance, during baking. In some embodiments, the leavening source is lipid encapsulated.

"Leavening acid" refers to an acidic leavening source such as dicalcium phosphate dihydrate (DCPD).

"Leavening base" refers to a basic leavening source such as sodium bicarbonate (baking soda), ammonium carbonate, ammonium bicarbonate, and potassium bicarbonate.

"Carbohydrate source" refers to a humectant that can reduce the water activity of the batter to about 0.85 or lower. In some embodiments, the carbohydrate source is a liquid or fluid with no more than about 30% by weight water and/or remain flowable at around 80°-110° F. In some embodiments, the carbohydrate source is a sugar alcohol such as glycerin.

"Soda" or "baking soda" as used herein refers to sodium bicarbonate.

"Pasteurized" refers to the condition achieved, for instance, by heating a product to a sufficient temperature and for a sufficient time to reduce the number of pathogens, such that the resulting food product is shelf stable.

"Starch source" includes any source of starch, such as flour, native starch, and modified starch. Starch may be derived from legumes, grains, roots, and tubers such as wheat, corn, tapioca, sago, rice, potato, oat, barley, and amaranth. "Native starch" refers to starch recovered in the original, unmodified form. "Modified starch" refers to starch that has undergone physical or chemical modification.

"Soft wheat flour" refers to wheat flour with a low protein content, for example, about 5-9% weight protein. In some embodiments, soft wheat flour has a protein content of about 8% by weight.

"Setting agent" includes any compound that can form a gel. In some embodiments, the setting agent forms a gel upon activation by high temperature, e.g., about 160° or higher. In some embodiments, the setting agent helps provide the structure to hold the volume that builds during the cooking or baking process. In some embodiments, the setting agent does not swell when hydrated or does not absorb more than (e.g., several times) its own volume of water. In some embodiments, the setting agent is a reversible thermo-gelling source.

"Reversible thermo-gelling source" refers to a setting agent which gels at high temperatures (e.g., above 160° or 165° F.) and, as it cools, returns to its original viscosity or a sufficiently low viscosity such that it is flowable or pourable. For instance, the reversible thermo-gelling source may be a liquid in ambient temperature and a solid in cooking or baking temperature range. In some embodiments, the reversible thermo-gelling source is a cellulose ether such as hydroxypropyl methyl cellulose (HPMC).

"Moisture source" includes water and any liquid suitable for use in food products.

"Such as" has the same meaning as "such as but not limited to." Similarly, "include" has the same meaning as "include but not limited to," while "including" has the same meaning as "including but not limited to."

The singular forms "a," "or," and "the" include plural referents unless the context dictates otherwise. Thus, for example, a reference to "a composition" may include one or more composition(s) and/or equivalent(s) thereof.

Any numerical range disclosed herein encompasses the upper and lower limits and each intervening value, unless otherwise specified.

Other than in the working examples, or where otherwise indicated, numerical values (such as numbers expressing quantities of ingredients, reaction conditions) as used in the specification and claims are modified by the term "about". Accordingly, unless indicated to the contrary, such numbers are approximations that may vary depending upon the desired properties sought to be obtained. At the very least, and not as an attempt to limit the application of the doctrine of equivalents to the scope of the claims, each numerical parameter should be construed in light of the number of significant digits and ordinary rounding techniques.

While the numerical parameters setting forth the scope of the disclosed subject matter are approximations, the numerical values set forth in the working examples are reported as precisely as possible. Any numerical value, however, inherently contains certain errors necessarily resulting from the standard deviation found in its respective testing measurements.

DETAILED DESCRIPTION

Throughout the specification and claims, percentages are by weight and temperatures in degrees Fahrenheit unless otherwise indicated.

The present invention relates to packaged ready-to-bake or ready-to-cook batters characterized by shelf stability at room temperature and to their methods of preparation. Each of the product components as well as product use and attributes and methods of their preparation and use are described in detail below.

Consumer habits with respect to food preparation have changed dramatically over the past 25 years. The days of a homemaker routinely making products such as breads, cakes, cookies, muffins, or pancakes "from scratch" within the home are substantially gone. Changing lifestyles for both consumers and manufacturers of food have resulted in a situation where time is a limiting factor when domestic cooking is concerned. In response to these changes in consumer habits and expectations, manufacturers of products such as cakes, cookies and pancakes have prepared intermediate (ready-to-cook) products for sale. The intermediate forms have included products such as batters and doughs. These intermediate forms of food products have been made available to satisfy the consumer's need for a freshly baked food item, while spending a minimum amount of time for food preparation along with a minimum risk of failure. The novel solutions described in this invention helps consumers enjoy convenient baked goods that can be prepared in a matter of seconds (in microwave ovens as in the case of cakes, brownies, muffins and cookies) or even minutes (in case of pancakes). Proper combination of ingredients and methods produced unexpected results providing bakery products featuring proper structure, improved volume and enduring moistness.

Unlike prior art technology, the inventive method does not require any vacuum to be applied to batter during its preparation, which display a shelf stability at ambient temperature of at least 12 months. The dough further having a water activity of below 0.85 and does not need to be packed in an essentially gas-impermeable pouch in an atmosphere of an inert gas containing low level of residual oxygen.

The inventive batter is quite different than commercial refrigerated doughs, such as bread dough, cookie dough, and the like which typically need to be hermetically sealed, stored under pressure and/or placed in modified atmosphere packaging (MAP) in order to provide good shelf stability properties under refrigerated storage conditions. With such refrigerated batters or dough, after the consumer opens the packaging for initial use of the product, the refrigerated dough cannot be stored for long periods of time thereafter. The inventive batter could be refrigerated and still be shelf stable after opening for long periods of time.

While the invention is specifically described in terms of various products such as layer cakes, muffins, quick breads, cupcakes, biscuits, corn bread, brownies, and the like, the batter-like compositions may be used for or formulated for use to prepare other cooked farinaceous goods within the scope of the invention, including but not limited to, griddle cakes such as pancakes, crepes, or cornbread, Irish soda bread or waffles. Also, while the batter-like compositions are especially suited for use in preparing leavened finished goods, other finished goods can also be prepared therefrom.

The present batter may be sold to e.g. supermarkets and/or cafeterias in containers, such as plastic containers or pouches at a size of for example 250-500 ml or 5-10 liters.

Accordingly, the liquid pasteurized batter of the invention is capable of being cooked, such as cooked on a pan, in a microwave oven and or in a conventional oven or a toaster oven.

The novel composition includes several precisely and scientifically selected ingredients at various proportions to achieve varying bakery items depending on final product desired characteristics. In general, the inventive composition may include:
1—Moisture source
2—Altered-gelatinization starch source (flour, starch, and/or flour replacement
ingredients)
3—Chemical leavening source
4—Carbohydrate source
5—Reversible thermo-gelling source
6—Emulsifier source The inventive composition is characterized by the fact that it has been microbiologically stabilized by heating to a temperature below the gelatinization temperature of the starch component for a time period sufficient to substantially reduce the bacterial count of the batter so as to make the batter storable for at least 12 months at ambient temperature. Careful selection of a starch having a gelatinization temperature of about 165 F or lower coupled with predetermined level of soft wheat flour (with protein content of about 8-9% or lower) in the absence of viscosity increasing agents, results in a pasteurized batter with low viscosity. Viscosity increasing agents may include specific types or hydrocolloids or gums, ingredients containing high protein level of heat set type or pre-heated starches. It is useful to maintain fluidity during processing to allow for ease of manufacturing and filling. If a chemical reaction between leavening agents occur, that may produce gas at pasteurization temperature and make the batter or dough thicker and hard to process and handle. As such, embodiments of the current invention are directed to the selection and timing of adding chemical leavening source.

When refrigerated ready-to-bake batters or doughs which have relatively short shelf live are produced, no heat treatment or pasteurization is carried out. The heavy texture and low flowability prevent effective heat transfer to achieve proper thermal activation of microorganisms. It is typically hard to move the batter or dough in the mixer to achieve proper treatment. Additionally, any high temperature above 130°-140° F. may cause gelatinization of the starch and denaturation of the protein making the product set and unmovable. To enable mixing, conventional doughs have to be processed in small size vessels of about 500 to 2,000 pounds.

To the contrary, the inventive methods achieve flowable consistency permitting proper agitation to thermally heat the batter. A combination of ingredients and processing parameters produce desirable consistency capable of being stirred and pasteurized. Additionally, the current methods allow for large processing vessels up to 40,000 pounds to be utilized offering significant production savings.

The inventive batter may have a protein content of about 0.2 to 4% depending on the desired viscosity and finished batter functionality. The higher the protein content the less flowability produced. For instance, if a bread dough or batter is desired, the protein content may be increased to produce more dense structure and bread like consistency.

Even though, the presence of acid may cause the batter to be more fluid, it may produce defective finished product. In addition, pH of 6.0 or lower as a result of adding acids or using acidifying agent as part of the leavening source, will react with sodium bicarbonate (soda) and release gas at room temperature, thus making the packaging bottle to bulge and may cause consumer injury upon opening. The latter reaction may still occur if the soda is not capsulated or even if it is inadequately encapsulated. The current invention ensures that the proper type of acidifying agent is selected and coupled with a fully encapsulated soda to prevent gas production at ambient temperature over the expected shelf life.

Unique Physical Property and performance of both batter and baked items is supported through the proper selection of a specific methyl cellulose gel which exhibit the property of reversible thermo-gelling. Once hydrated, a solution with such a gel will gel at only high temperatures. This gel is reversible such that, as it cools down it returns to original viscosity. There are many cellulose derivatives, however, it was pleasantly surprising to discover that a type of cellulose gel namely hydroxypropyl methyl cellulose that gels at temperatures above 165 F can offer the following benefits: low viscosity during processing and shelf life; pourability and bake stability upon cooking or baking. Furthermore, it offers excellent shape, water retention and mouth feel to the finished baked goods. The concentration of this reversible thermo-gelling source could be manipulated to produce batters suitable for making various products ranging from thinner batter for pancake application to heavy batter for cookies and muffins.

The reversible thermo-gelling source forms temporary structure which entraps bubbles of carbon dioxide when cooked and allow for starch source to gelatinize at higher temperature, thus supporting the structure and increasing volume of baked goods. Even though this gel is selected to achieve high viscosity at above 165° F., it was surprising to discover that when heated below its gel activation temperature, it will provide low viscosity liquid batter that is flowable and pourable, unlike gels formed by protein based thickeners that once activated, become irreversible and cause undesirably high viscosity. Such irreversible setting agents gel at pasteurization, stay set and do not revert to a lower viscosity as before heating to high temperatures. The reversible thermo-gelling source maybe added after pasteurization at a temperature of about 50°-150° F. where it does not produce noticeable gelling impact and does not increase viscosity of the batter making the batter less flowable.

In accordance with some aspects of the invention, the batter compositions can provide an adjustable viscosity. Thus, the batter compositions can be formulated to provide viscosities that can range from pourable to relatively non-pourable. In some embodiments, the batter compositions can provide a relatively less viscous batter when it is desirable to pour the batter into a baking pan or a microwavable container. In some embodiments, the batter compositions can be provided as batter compositions that are relatively more viscous and non-pourable. In further embodiments, the batter composition is sufficiently viscous to be extrudable if desired. In some aspects, the invention provides the ability to formulate batter compositions to provide a desired viscosity. Thus, batter formulations possessing a viscosity profile that allow the product to be pourable from a container can be provided. Flowable batters would be characterized by being able to flow under their own weight. In other aspects, batter formulations could be designed to be generally non-flowable and spoonable. These batters would need a force to be applied to the batter to allow this batter to flow. These non-pourable batters can be used when it is desired to be in a pre-deposited container, for example, a baking pan, individual cups or muffin tin. Batter compositions can be formulated to possess viscosities outside these ranges, and intermediate to these ranges, in accordance with the principles discussed herein.

The precise manipulation of viscosity is achieved in the current invention through adjusting the protein level in flour, using flour treated at various temperature to achieve certain gelatinization level, addition of native starch, addition of reversible thermo-gelling agent, controlling the pH of the batter, amount of lipid, eliminating any gas production in the batter before cooking, sequence of ingredient addition, pasteurization temperature and duration as well as other combination of many control parameters that have not been used in the prior art.

Precise selection of components extends to chemical leavening source, which includes soda and acidifying agents. When conventional soda was incorporated either or before pasteurization, it reacted with acidifying agents and produced gas during processing. Lipid encapsulated soda with about 50 to 70% fat content can delay acid production during manufacturing and storage until baking heat is introduced. Lightly or unevenly coated soda can produce gas even at room temperature especially if the acidifying agent is not carefully selected to be of characteristics that only release acid at elevated temperature used in baking or cooking or encapsulated. Encapsulated soda may contain higher temperature melting fat to be more stable at higher temperature during storage and handling. Embodiments of the inventive methods include proper selection of sodium bicarbonate particle size.

Acidifying agents that release acid at room temperature or below 140° F. should be avoided in order to minimize gas production during manufacturing. Dicalcium phosphate dihydrate (DCPD) can control gassing up during processing and shelf life and to deliver favorable texture and sponginess of finished baked or cooked item particularly if non-encapsulated leavening acid is used. Even though baking experts advise that DCPD is never to be used alone and should be combined with other agents, it was discovered in the present invention that DCPD, even non-encapsulated, can eliminate premature gassing up and provide excellent gas reaction during baking or cooking. More surprising was to discover that adding DCPD after the heat treatment and cooling the batter down to about 500 to 150° F. helped completely eliminate the chemical reaction with encapsulated soda (at 50% fat encapsulation or higher) until the batter is baked. It has been found that use of DCPD as acidic leavening agent in combination with selected particle size encapsulated carbonate can provide batter compositions that reduce or avoid premature leavening of the batter prior to baking or cooking.

Employing encapsulated leavening acids can eliminate premature leavening chemical reaction. It was discovered that co-encapsulation of both basic and acidic agents of proper micron size offer advantages over adding singularly encapsulated agent if desired.

Most current batter production methods are performed at lower temperatures where batters are never heated, but are refrigerated or frozen to extend shelf life and avoid untimely gas production. Since there is no pasteurization, such batters are not stable at ambient temperature. The inventive methods employ pasteurization to extend shelf life and produce pourable batters that do not gas up at any stage of production, handling or storage, but rather release gas only during cooking or baking.

Furthermore, balance among selected ingredient sources helps ensure proper production, storage and finally consumption by consumers. For instance, it was discovered that corn starch, when tested against other starches, can be particularly useful due to its higher gelatinization temperature. Corn starch can ensure lower viscosity during processing and filling, while providing solid structure upon cooking or baking. When combined with soft wheat flour, the resulting batter achieves a consistency that is suitable for producing, for instance, pancakes similar to those that are homemade.

As will be illustrated, the sequence of ingredient source addition and the temperature gradient at which each ingredient is added can be useful in the inventive methods. Therefore, in some embodiments, the inventive methods provide a precise order of steps to produce the batters and doughs as described herein. In some embodiments, the inventive methods comprise selecting ingredients that provide precise matrices of water, fat, carbohydrates, starch, protein, leavening agents and texture setting agents to manufacture batters and doughs that have been pasteurized, yet are flowable, squeezable and capable of producing high quality finished items when cooked or baked.

Advantageously, the viscosity of the inventive batters can be kept to a low level throughout storage and up to the consumption point. Heavy batters, in contrast, do not exit packages easily and a sizable portion of such batters tend to be wasted. In some embodiments, the inventive batters have a viscosity of about 500-20,000 centipoise, about 1,000-6,000 centipoise, or about 7,000 to 20,000 centipoise. In other embodiments, more viscous batters, e.g., with a viscosity of about 30,000 centipoise, could be produced and dispensed into containers ready for baking.

In further aspects, the invention provides food package kits comprising a container suitable for dispensing batters; and at least one batter composition disposed in the container. The batter composition, for instance, may comprise a moisture source, an altered-gelatinization starch source (e.g., flour, starch and/or flour replacement ingredients), a chemical leavening source, a carbohydrate source, a reversible thermo-gelling source, and a lipid source.

Additionally, in other aspects, the invention provides food package kits comprising a batter composition and a topping, garnish and/or other solid food additive in a container with two or more separate compartments suitable for delivering batters and additives. For example, one compartment may contain the batter composition, whilst the second contains a topping or garnish, which may be added to the batter composition before it is cooked or microwaved.

Moreover, in other aspects, the invention provides food package kits comprising a batter composition and a syrup, frosting and/or other liquid food additive in a container with two or more separate compartments suitable for delivering batters and liquid additives. For example, one compartment may contain the batter composition, whilst the second contains a liquid additive, which may be added to the batter composition after it is cooked or microwaved.

Moisture Source

The present batters have a total moisture content between 10% and 35%. The total moisture includes water provided with or associated with the various ingredients. For example, total moisture includes the moisture associated with flour, starch, and other ingredients. Moisture in the batter may also be added in part by the use of sugar syrups such as maltose syrup or corn syrup or fructose syrup or others, or as part of dairy products included in the formulation.

To control the impact of water content on finished batter, particular ingredients and concentrations (particularly of the carbohydrate source) are selected to provide batters having a water activity ranging from about 0.65 to 0.85 and, in some embodiments, about 0.80 to 0.85. Proper selection of such water activity value is useful to achieving a balance between microbial shelf stability and batter handling characteristics. Water content in the inventive batters are generally lower than homemade batters that are baked in a short period of time and do not need to be preserved.

Altered-Gelatinization Starch Source

The careful selection of structure providing starch component is useful to achieving the proper flowability and viscosity during processing, shelf life storage and utilization of the batter, yet produce baked goods with proper features for a given variety.

In any of the methods exemplified herein, flour is used as the main raw material of the batter premix. Naturally, the raw material flour contains gluten, which is thermally denatured when heated to form a mesh structure of the sponge texture of for example a cake. However, the mesh structure actually causes the cooked cake to exhibit a hard gum-like texture, resulting in the failure to produce a light and soft voluminous feel. That high gluten complicate the pasteurization step and produce coagulated mass.

In some embodiments, flour having a low gluten or protein content is used. In the case of using such a flour, it is certainly possible to eliminate or lower the hard gum-like texture of the pasteurized batter. In this case, however, another difficulty is encountered. Specifically, the mesh structure of the baked batter serves to hold the gas generated from the expanding agent so as to support the skeleton of the baked item. In the case of using the particular flour noted above, the mesh structure is not formed sufficiently, resulting in a marked reduction in the role of supporting the skeleton of the cooked batter. It follows that it is impossible to maintain the volume of the baked item immediately after baking, giving rise to a large bake shrinkage. As a result, another problem is generated. The inclusion of the proper reversible thermogel help minimize this problem.

The present batter compositions may contain from about 1 to 50% of the batter as flour. Conventionally, flour is standardized to a moisture content of about 14%. However, dried flours with considerable lower moisture contents can also be used. Flour(s) useful herein can be of conventional type and quality including cake flour which contain lower protein levels. Wheat flours can be used but other flours conventionally used in the preparation of baked goods can also be employed in full or partial substitution for the wheat flour. Traditional cake flour used for layer cakes has about 9% or less protein by weight of the flour. Pastry flour ordinarily has a protein level of about 10%. Other flours such as bread flour generally have higher protein levels of about 11 to 13% by weight. In some embodiments, the protein range for the wheat flour to be used in this invention is between about 7 to 10% by weight of the flour. A good general all-purpose flour with low protein level could also be utilized. Such flours may be particularly useful if the average protein content ranges from about 7 to 8% by weight.

In some embodiments, the enzyme-inactivated flour has essentially zero alpha-amylase activity, essentially zero lipase activity, and peroxidase activity is reduced by more than 90%. In some embodiments, the enzyme-inactivated flour also has essentially zero lipoxygenase activity.

It was found that during the enzyme-inactivation of the flour by heat-treatment, a pre-gelatinization of the starch may cause difficulties in the spreading characteristics of the dough. Therefore, in some embodiments, heat-treatment is applied without any pre-gelatinization. In some embodiments, flour that is treated to the minimum possible temperature during preparation is used to produce low viscosity batter.

A starch may also be incorporated into the dough of the present invention. In some embodiments, the starch is a native starch. Useful native starch includes, but is not limited to, wheat starch, corn starch, potato starch, tapioca starch or a combination of any of these. In accordance with the invention, native starch is the major component of the starch source ingredient, comprising 10% by weight or more, or 75% by weight or more, or 80% by weight or more, of the starch source As used herein, "native starch" refers to starch recovered in the original form (i.e., unmodified) by extraction from any starch-bearing material.

The inventive method may incorporate exclusively flour without the addition of any additional starch ingredient. Furthermore, a gluten free product could be produced utilizing a blend of gluten free starches.

Optionally, a minor amount of modified starch can be included in the starch source. Modified starch can be included, for example, to modify the viscosity of the overall batter composition. Typically, the amount of modified starch included in the starch source is on the order of 5% or less, or 10% or less, or 15% or less of the starch source.

Gelatinization is the process of disrupting the physical structure within the starch granule as it is heated in the presence of water. During the gelatinization process, the viscosity is increased by the granules absorbing water and swelling. In some aspects, the invention provides the ability to formulate batter compositions to provide a desired viscosity. Thus, batter formulations possessing a viscosity profile that allow the product to be pourable from a container can be provided. Flowable batters would be characterized by not having a yield stress value and being able to flow under their own weight. The rate at which the batter flows would be related to the temperature, force applied, and the product response to the applied force. In other aspects, batter formulations could be designed to be generally non-flowable. These batters would possess a yield stress value, which, after a force of this value being applied to the batter, will allow this batter to flow. The rate of flow will be dependent on the temperature, the force, and how the product formula responds to the force applied.

Altered-Gelatinization Protocol (AGP) is performed to retard starch swelling at about 165 F or below. The resultant starch is utilized as Altered-Gelatinization Starch (AGS) which is incorporated in the invention to produce pourable or semi-pourable batter or dough. It was pleasantly discovered that when a starch source is heated to 165 F or below in the presence a disaccharide ester or alike of gelatinization retarding ingredients and at water activity of about 0.85 or below, the gelatinization of the starch is eliminated. A desirable starch level in the formula the starch is below 25%. Above 25%, gelatinization was delayed but to a lesser degree. Therefore, the careful selection of starch level should be observed to achieve proper viscosity. When heated to about 160 F for instance, a runny product is produced as the disaccharide ester altered and restricted starch gelatinization and provide low viscosity liquid like batter.

It was pleasantly discovered that when Altered-Gelatinization Protocol (AGP) was followed in the presence of a humectant like glycerin, lower viscosity is obtained compared to when glycerin was added after pasteurization and cooling of the batter. The invention discloses a liquid pasteurized batter having a viscosity of 1,000-20,000 centipoise at 25 C as measured by a viscosity-meter. Even at high starch concentration of about 30%, the pasteurized batter had a viscosity of 4000 centipoise.

The batter of the current invention is free from egg and egg products and still provided proper leavening and was stable at ambient temperature without any need for refrigeration or freezing. Egg is not needed for proper performance of the inventive batter, however, egg and egg products might be incorporated to achieve a given attribute if desired.

The current batter is safely edible before cooking as it is heat treated to kill pathogens. Other conventional doughs or even dry mixes are not safe to consume before cooking and carry a warning statement to the consumers.

Wheat flour alone or in combination with corn starch is used as starch source, no gelatinization during the pasteurization at about 160 F took place at the current water activity of about 0.85 or lower. Rather, gelatinization occurred during baking or cooking of the inventive batter. In an illustrative embodiment, a cake batter comprising 100% wheat flour as the starch source was formulated to provide a flowable batter composition. When the starch source was altered to comprise 90% native starch and 10% modified (pre-geld) starch, the consistency of the batter was observed to resemble the consistency of a cookie dough or brownie batter. This adjustable viscosity feature of the invention can provide enhanced flexibility in formulation and packaging, such that a wide variety of batter products can be provided to consumers.

Chemical Leavening Source

The dough of the present invention contains a leavening system. It has been found that use of DCP as acidic leavening agent in combination with a carbonate source can provide batter compositions that reduce or avoid premature leavening of the batter prior to baking or cooking. Premature reaction of the leavening agents can produce carbon dioxide, which can in turn result in increased volume of the batter composition and increased volume of the packaging for the batter composition (i.e., package bulging). Such package bulging can be perceived as unacceptable by the consumer. Moreover, premature leavening can use up the leavening agent prior to baking/cooking, resulting in a final product that has unacceptable finished quality. In some aspects, the inventive batter compositions provide batters that exhibit heat-activated leavening. Heat-activated leavening as described in this application means that a substantial release of carbon dioxide does not occur in a batter at ambient temperature. However, substantial carbon dioxide release occurs during the baking or cooking operation thereby providing the baked or cooked product with desirable texture. In accordance with some aspects of the invention, DCPD can retain leavening capacity for a prolonged shelf life as compared to conventional acidic leavening agents.

Generally speaking, chemical leavening bases, namely sodium bicarbonate (baking soda), ammonium carbonate, ammonium bicarbonate, and potassium bicarbonate, are recited herein. In some aspects, baking soda can serve as the primary source of carbon dioxide gas in many chemical leavening systems. The leavening system may comprise an encapsulated chemical raising system which is stable during the production and storage of the batter of dough. In some embodiments, sodium bicarbonate (soda), which is encapsulated with high melting point lipids, is used. An encapsulated basic chemical leavening agent may be selected based on its degree of encapsulation or "activity." "Activity" refers to the percentage by weight of basic chemical leavening agent that is contained in encapsulated particles based on the total weight of the particles. A useful degree of encapsulation or activity can be an activity that does not allows any amount of basic agent to be released from encapsulation prior to baking or cooking, to result in desired stored and baked/cooked dough properties. According to embodiments of the invention, an encapsulated basic chemical leavening agent can have any useful activity, with activities in the range from 10 to 50 percent. As exhibited in the examples, the higher the ratio of fat to soda, the more stable the batter is. In some embodiments, 50% lipid: 50% soda ratio is used in order to reduce premature activation of the leavening source. In some embodiments, the soda if fully and completely coated with lipid to avoid exposed surfaces that may react with the acidifying component.

According to one embodiments of the invention, an encapsulated basic chemical leavening agent has a coarse physical state instead of a fine or very fine powder form. Granulated materials might be employed. It was discovered that if the soda is combined with an acidifying agent other than DCPD, even though the encapsulation may reduce premature gas production, it did not prevent it, especially at higher temperatures of 104°-130° F., which might be reached during transportation. Even though flexible packages may be used for the final batter to accommodate some gas production in the package, this premature gas production can deform more rigid bottles made from PET or HDPE material. In some embodiments, the current invention employs the encapsulation of sodium bicarbonate with particle sizes larger than about 100 micron. In some embodiments, the particle size is about 50 to 1000 micron. In some embodiments, the mesh size is about 150 to 280. Sodium bicarbonate with particle sizes larger than 100 micron could be encapsulated utilizing known methods.

Increasing the particle size of baking soda results in less surface are available for reacting with acidic leavening agent even after encapsulation. Selected encapsulated soda is incorporated at about 0.1 to 5% depending on the desired finished product. Muffin requires less soda than cake and pancakes. Obviously, lipid level in the microencapsulated granule may be compensated for to provide sufficient amount of reactive soda. Higher lipid encapsulation may require higher utilization level.

Acidic chemical leavening agents are generally known in the baking arts, with examples including sodium aluminum phosphate (SALP), sodium acid pyrophosphate (SAPP), monosodium phosphate, monocalcium phosphate monohydrate (MCP), anhydrous monocalcium phosphate (AMCP), dicalcium phosphate dihydrate (DCPD), dicalcium phosphate (DCP), sodium aluminum sulfate (SAS) may be employed. Encapsulated acids such as glucono-delta-lactone, citric, lactic, malic, potassium hydrogen tartrate (cream of tartar) as well as a variety of others, and combinations of any of these could be employed in the inventive methods at low concentration in the final batter. Acidic chemical leavening agents come in a variety of solubility at different temperature ranges. An illustrative leavening source includes encapsulated baking soda and either encapsulated or non-encapsulated DCPD. In some embodiments, acidic chemical leavening agents may be either encapsulated or non-encapsulated. In some embodiments, encapsulated acidic chemical leavening agents, which delay acid reaction by shielding the acid until the phase of final baking, are used.

The acidic chemical leavening agent can be present in an amount that provides one or more useful properties as described herein, including stability at ambient temperatures and providing desired baked or cooked leavening properties following ambient storage. For example, the leavening source can make up about 4-6% by weight of the batter composition, or in the range of about 0.1% to about 3% by weight of the batter composition. The ratio of leavening acid to encapsulated leavening base can be in the range of about 0.5:1 to about 3:1.

The relative amount of leavening acid to leavening base can be selected taking into consideration the neutralization value (NV) of an agent as discussed herein. Illustrative NVs for sodium bicarbonate include: 73 for SAPP, 80 for MCPM, 100 for SALP, 33 for DCPD and 40 for DMP3H.

This inventive leavening source is stable at ambient temperature and acts as a raising system only at higher temperatures which means only during baking, when the coating melts at temperatures above 160 F. With the precise selection of leavening source components, little premature leavening chemical reaction may take place neither during manufacturing or shelf life. Premature gas production cause packaging defects and pre-consume actives thus impacting rising of the batter during cooking or baking. Premature gas introduction negatively can impact the dispensability of batter either into packaging components or final baking utensils and should be avoided at all cost.

The current novel approach teaches using encapsulated leavening sources including encapsulated soda and encapsulated acidic leavening component in order to ensure full delay of chemical leavening reaction.

Generally speaking, the pH level of batter compositions can impact stability, leavening capacity, color, and/or flavor of the compositions as well. In some embodiments, the inventive batter compositions can have a pH that is comparable to conventional batters. In some aspects, the inventive batter compositions can provide advantages over known or conventional batters, in that the pH levels of the batter compositions can be approximately neutral. In some embodiments, batter compositions in accordance with the invention can have a pH of 6.5 or greater, or 7.0 or greater. In some embodiments, inventive batter compositions can have a pH in the range of about 7.5 to about 8, or about 6.5 to about 7.5, or about 7.0. In these embodiments, the batter compositions are not required to be acidic in order to provide shelf-stability, microbial stability and/or color stability. This can be advantageous, as it can minimize or avoid addition of ingredients, such as acids or acidifying leavening ingredients to adjust the pH level to acidic.

It was discovered that the proper selection of acidic leavening agents (leavening acids) can be advantageous not only during shelf life and later baking, but also during manufacturing of the batter. Leavening acids produce significant amount of gas during processing. Batter Measure of Gas Production (BMGP) which is the measurement of the amount of carbon dioxide produced during various stages of making the batter namely: mixing, bench time and baking. BMGP is controlled by the leavening acid's physical and chemical characteristics. For instance, monocalcium phosphate produce about 60% of its capacity at mixing stage, very little at bench time and about 40% during baking. If the early release of carbon dioxide is not minimized, the viscosity of the batter will increase and provide pliable yet not easily pourable texture. When pancakes for instance is baked, little gas production capacity is left to produce quality pancakes. The selection of the proper leavening acid is advantageous in the current invention which avoids gas reaction at any stage for manufacturing, handling and storage until the final baking or cooking. A useful acidic leavening agent is DCPD which can provide neutral pH batters that stay almost constant during shelf life with no detrimental gas production until final baking. The selected DCPP has a desirable BMGP which produces about 0% of its gas production capacity at mixing stage, very little at bench time and about 100% during baking, ensuring that the early release of carbon dioxide is minimized, not impacting the viscosity of the batter and providing easily pourable texture. When pancakes using DCPD are cooked, significant gas production capacity is left to produce quality pancakes.

Even though it is advised in the baking industry not to use DCPP alone and to use DCPD in combination with other agents, it was discovered in the current invention that DCPD is capable of working alone producing quality products.

Furthermore, the current invention may utilize encapsulated leavening acids to minimize acid reaction during early stages of production and subsequent handling. In some embodiments, lipid coverage of the agent is as complete as possible such that chemical reaction does not occur at any stage of production and handling. A blend of encapsulated and non-capsulated agents may be employed in the current invention.

Even though lowering water activity to about 0.70 to 0.60 might be useful tool to reduce premature gas production, the batter may be too viscous and not runny enough to be delivered out of the retail container easily. Batters produced at the above water activities may not produce the proper sponginess of pancake batter upon cooking and may produce sticky cakes that exhibit undesirable properties.

Reversible Thermo-Gelling Source

The inventive batter compositions also include a setting agent that contributes to the unique handling and baking properties described herein. The setting agent comprises a continuous phase throughout the batter-like composition at temperatures below the gelling point of the setting agent, thereby imparting rheological properties akin to fluid materials. Upon baking, the setting agents gel, creating a structural matrix to hold the batter composition together until starch gelatinization takes place and reinforce the structure of baked or cooked item. Furthermore, the gelling agent holds the gas produced by the chemical leavening upon heating.

In some aspects, suitable setting agents are thermally-reversible components, in that the agents exhibit phase differences as a function of temperature. For instance, setting agents suitable for use in accordance with the invention can exist in a first phase as fluid within ambient temperature range, and a second phase as a solid matrix within cooking or baking range. For example, the setting agents can exist as a liquid within a temperature range below baking temperatures (such as those encountered during preparation, storage, and handling), but solid at baking temperatures. Desirably, the setting agent does not swell when hydrated and not absorb several times its own volume of water as it is the case in the prior art utilizing setting agents. Upon activation by high temperature above about 160 F dehydrates and form a gel.

Unsuitable hydrocolloids include hydrophilic polymers that can be of vegetable, animal, microbial, or synthetic origin that has water binding, thickening and gelling at temperature below 130 F which results in non-fluid or non-pourable characteristics. Many of the mot recommended materials can be described as gums and hydrocolloids hydrocolloid including agar, alginate, carrageenan, guar gum, gum Arabic, locust bean gum, and xanthan gum. Setting agents that are not recommended for this invention are those have a setting point in the range of about 70° F. to about 130° F. Proteins materials that gels at low temperatures like gelatin should be avoided as it will increase the viscosity during processing and shelf life. The abovementioned materials have the negative implication of losing its setting properties at baking temperature, thus not supporting the textural matrix and not holding carbon dioxide produced by the leavening source at cooking or baking temperatures. Furthermore, proteins that are liquid at low temperatures, yet coagulate at high temperatures (i.e. milk derivatives) could be used as setting agents as long as they do not gel during pasteurization or during storage. In some aspects, the protein can be selected from caseinate, albumin, whey protein concentrate, nonfat dry milk, buttermilk, or a combination of any two or more of these. Egg albumin may be added after the pasteurization step to avoid coagulation.

A particularly useful setting agent is a reversible thermo-gelling agent. The setting agent is selected to provide a structure to the inventive batter composition, in addition to structure provided by starch source, only at baking temperature but keep viscosity relatively low during processing and storage at ambient temperature. It was pleasantly surprising to find the functional source to be cellulose ether type. Ccellulose ether products are available in two basic types: methylcellulose and hydroxypropyl methylcellulose. Both types have the polymeric backbone of cellulose, a natural carbohydrate that contains a basic repeating structure of anhydroglucose units.

The viscosity of an aqueous solution of cellulose ether is proportional to the molecular weight or chain length of the specific product used. Because cellulose ether products are nonionic, the viscosities of their solutions are generally stable over a wider pH range than are the viscosities of gums that are ionic in nature. Cellulose ethers also exhibit interfacial or surface gelation phenomena as a result of their surfactant nature. Interfacial gelation plays an role in the current application where emulsification is desirable. Cellulose ether products exhibit surface thermal gelation due to the migration of polymer molecules to the air/water interface.

In some embodiments, the setting agent is hydroxypropyl methylcellulose (HPMC). HPMC helps retain volume during baking and prevent collapsing during baking and cooling. During baking, HPMC forms a reversible thermal gel (heat setting). This thermal gel forms at around 70-75° C. and helps to provide the necessary structure to hold the volume that builds during the baking process. At the end of the baking process, and upon cooling, the HPMC thermal gel will start melting and the starch gel will progressively form and take over to help prevent the bread from collapsing. In some embodiments, F50 HPMC from Dow Chemical is utilized.

When HPMC is added, hydration or viscosity build is a function of the level of surface treatment as well as temperature, pH of the system, and concentration of the HPMC. Normally, the concentration of HPMC in a system does not become a factor until the concentration exceeds 5% by weight (relative to water in the system). At higher concentrations and higher water activity, the time of hydration is reduced. As the water content of the batter is about 20-30, and at 2% HPMC addition (corresponds to about 6 to 10% concentration in the water phase) that triggers viscosity build immediately following dispersion rendering the processing more difficult and produce heavy batter. If the batter is then pasteurized, a high viscosity is produced. One advantage of the current invention is that HPMC is added after pasteurizing and cooling down. The second advantage is that when HPMC is incorporated into a batter full of various ingredients at low water activity of about 0.85 or lower, the hydration is slow and possibly incomplete. That partial hydration is desirable as the viscosity buildup is limited until final baking or cooking takes place.

A viscosity buildup can be initiated by adding a small amount of a base, such as un-encapsulated sodium bicarbonate that raises the pH to approximately 8-9 which will causes the hydration to be completed in just a few minutes and allow full viscosity to be reached. A third advantage of the current invention is that the system includes encapsulated soda that cannot raise the pH of the batter to 8-9 where undesirable viscosity build up occur.

Additives such as glycerin and sorbitol can lower gelling point by lowering the solvency of the aqueous system and by replacing water and increasing the concentration of reversible thermo-gelling agent, resulting in a more rapid dehydration. The current method recommends adding the reversible thermo-gelling agent after pasteurization and cooling to about 80° to 120 F°. Even though the agent could be added before heating, it was discovered that a thicker texture may result in the presence of glycerin which lowers the gelling point to a level close to selected pasteurization temperature of about 160° F. Such a premature gelation hinders ease of processing and filling of the retail containers as well as provide less squeezable batter.

The inclusion of thermally-reversible components prevents the batter from collapsing during cooking under microwave energy. Typical batters or doughs go significant volume retreat after rising the microwave due to weak structural support by conventional ingredients under fast energy penetration.

In conventional baking, cellulose gums are used to create additional cold viscosity which offers improved dough handling and reducing stickiness, making a dough instead of a batter and improving depositing weight control and helping to enable shaping to bake without tins, they also bind the moisture during the heating process and help slow down moisture loss and hence reduce the drying out of the product during shelf-life. In the current invention, cold viscosity may be avoided. In conventional dough making, HPMC is added to a cold unpasteurized or non-heat treated dough to be heated to activate HPMC during baking. In the present invention, HPMC is added to the batter after the thermal heat treatment and stays inactive until it is later baked.

Until the present invention, HPMC was not added directly to pasteurized batter. A person skilled in the art will utilize methyl cellulose gums according to instructions provided by the supplier, which in the case of the current methodology will produce less than satisfactory results during processing, storage and final use by consumers.

In some embodiments, the setting agent is Methylcellulose F50. This hydroxypropyl methylcellulose with medium substitution hydrates in temperatures less than 77° F. without significant increase in viscosity, gels between 140°-160° F., and melts below 95° F., which makes F50 a particularly useful texturing agent in the current invention.

In some aspects, the batter comprises about 1 to about 2 weight percent reversible thermo-gelling agent, add at a temperature of about 80° F. to about 120° F., wherein the batter has a viscosity of about 2000 cps or less at 40° F. The selected Methylcellulose may be incorporated at percentages of about 0.1 to 4%.

Carbohydrate Source

Suitable materials for use as carbohydrate source are those liquids and fluids with minimal amount of water (about 30% or less) and remain flowable at around 80 to 110 F. Other dry carbohydrate sources may be utilized. Example of such material are sucrose, glucose, fructose, glycerin (about less than 1% water, liquid at room temperature, viscous, stable, hygroscopic, clear, odorless, noncorrosive, and sweet tasting), and polyols (also referred to as sugar alcohols, part of polyols' chemical structure resembles sugar and part is similar to alcohols, the terms polyhydric alcohols and polyalcohols may also be used). Polyols group includes glycerol, maltitol, sorbitol, and xylitol, and mannitol, isomalt and hydrogenated starch hydrolysate. Other examples of suitable media are propylene glycol, lactitol monohydrate, and erythritol. Other suitable media may include syrups of sweeteners such as maltose, fructose, glucose or other mono and disaccharides or natural syrups such as honey, maple syrup and corn syrup.

Carbohydrate source acts as a humectant to reduce the water activity to the recommended level in this method, about 0.85 or lower, in addition to imparting desirable taste. The level of incorporation could be about 5 to about 20%. In another embodiment, the level was about 10 to about 15%.

Use of a sugar alcohol in place of carbohydrate sweeteners allows for both lowered water activity and lowered sweetness in addition to lowered viscosity. In some embodiments, the sugar alcohol is glycerin. In further embodiments, the sugar alcohol constitutes about 1-25%, alternatively, about 7-15% by the weight of finished batter.

Sugar alcohols are usually incompletely absorbed into the blood stream from the small intestines which generally results in a smaller change in blood sugar than "regular" sugar sucrose. This property makes them popular sweeteners among diabetics and people on low carbohydrate diets. However, like many other incompletely digestible substances, over consumption of sugar alcohols (other than glycerin) can lead to bloating and diarrhea because they are not absorbed in the small intestine.

Emulsifier Source

In some embodiments, the present batter further comprises an emulsifier source at about 0.01-4%, or about 0.05-3%, by weight of the batter. Such emulsifiers aid the realization of baked goods with improved grain structure and texture. The emulsifier is also useful to maintain the emulsion integrity of the batter over extended room temperature storage. Emulsifiers can be prehydrated in an aqueous dispersion and added to the batter composition. They can also be part of an emulsion or dispersion with or without a fat component. Generally useful emulsifiers are partially esterified polyhydric compounds having surface-active properties. This class of emulsifiers includes among others, mono- and diglycerides of fatty acids, such as monopalmitin, monostearin, monoolein, and dipalmitin; partial fatty esters of glycols, such as propylene glycol monostearate and monobehenate; glyceryl-lacto esters of fatty acids; ethoxylated mono- and diglycerides; higher fatty acid esters of sugars, such as the partial palmitic and oleic acid esters of sucrose; and phosphoric and sulfuric acid esters, such as dodecyl-glyceryl ether sulfate and monostearin phosphate. Other examples include disaccharides ester, partial esters of hydroxycarboxylic acids, such as lactic, citric, and tartaric acids with polyhydric compounds, for example, glycerol lacto-palmitate, and the polyoxyethylene ethers of fatty esters of polyhydric alcohols, such as a polyoxyethylene ether of sorbitan monostearate or distearate. Fatty acids alone or esterified with a hydroxy carboxylic acid, for example stearoyl-2-lactylate, are also useful.

Sucrose esters are chemically synthesized by esterifying sucrose with edible fatty acids from palm oil. This enables them to be used as emulsifiers in virtually all food products. Sucrose esters are used in bakery to maximize the mouth feel provided by fat, provide a finer crumb structure and a softer texture. In addition to emulsification, sucrose esters have other functions including aeration, texturization, protein protection and fat or sugar crystallization. Sucrose esters are unique in a way that they can boost other emulsifiers and improve the air bubble structure and prevent proteins from browning. These substances are remarkable for their wide range of hydrophilic-lipophilic balance or HBL. The polar sucrose moiety serves as a hydrophilic end of the molecule, while the long fatty acid chain serves as a lipophilic end of the molecule.

Sucrose esters are produced with sucrose, from beet and cane source, and fatty acids from palm oil. Sucrose esters of fatty acids, commonly known as sucrose esters, are a unique group of emulsifiers. Sucrose esters are obtained by esterifying sucrose with methyl fatty acids. By varying the degree of esterification of the sucrose molecule it is possible to obtain emulsifiers with HLB values ranging from 1 up to 16. A conventional use of disaccharides in the food manufacture industry is as emulsifiers, which may be added to a starch based food composition to improve its physical properties, e.g. to aid the dispersion of fat and air bubbles into mixture of water and flour and thereby improve viscosity and homogeneity of said food composition, such as a liquid batter. In one embodiment the disaccharide ester is selected from sucrose ester, lactose ester, maltose ester and/or cellobiose ester. Other disaccharides are also within the scope of the invention. In some embodiments of the invention, the disaccharide ester used in the manufacturing process is sucrose ester.

Sucrose esters have various functionalities, including their emulsifying properties, that can be useful in preparing baked goods. For instance, the chemical structure of sucrose esters can enable interaction with the proteins in flour by hydrophilic and/or hydrophobic bindings, resulting in a more flexible gluten network, which is better able to withstand the mechanical forces applied during intensive kneading, and to maximize gas retention. Also, the non-ionic character of sucrose esters can enable interaction with the amylose in flour and starch, resulting in delayed starch gelatinization and delayed starch retrogradation (retrogradation is a reaction that takes place when the amylose and amylopectin chains in cooked, gelatinized starch realign themselves as the cooked starch cools). As a result, foods having a soft crumb structure, increased volume and extended shelf life can be produced.

Emulsifiers show both hydrophilic and hydrophobic properties on the same molecule. The lipophilic portions of emulsifiers are believed to form a complex with the amylose fraction of starch during cooking, retarding starch gelatinization and decreasing swelling Complexation with lipids reduces the solubility of starch in water, alters the rheological properties of pastes, decreases swelling capacity, increases gelatinization temperature and reduces gel rigidity The progress of the starch gelatinization process is related to the absorption of energy required for destroying the native structure of the starch grains, accompanied by water adsorption (swelling). The observed changes in the endothermic peaks are due to the different degree of the starch swelling in the sponge batters during the heating. Therefore, the change in the energy value of the sponge system is caused to some extent by the change in the forms of the bound water. As a result, the water activity of the sponge system correlates to the forms of the bound water. The water activity characterizes the reaction ability (chemical potential) of the water in the system. If the water activity decreases, the chemical potential decreases too, and then the reactions involving the water in the colloidal system will require more energy in comparison with the free water. The factors affecting the water activity, type and concentration of the ingredients and the temperature of the environment, determine the forms of the bound water, which is involved in the process of the starch gelatinization.

The surfactants (emulsifiers) used in the present invention can help retard starch gelatinization during the baking process, particularly when combined with humectants that lower the water activity, thus resulting in more energy being needed to gelatinize starches. In contrast to the inventive batters, conventional doughs and batters have higher water activities which may result in faster reaction and gelatinization of starches.

The total amount of emulsifier(s) in the batter compositions can be adjusted such that suitable organoleptic properties are obtained. That is, the total level of emulsifiers in the batter-like compositions can be adjusted such that the final baked goods prepared from the batter-like compositions have a rich mouthfeel, a smooth texture and a baked specific volume as described herein Sucrose ester and/or other substitute may be used alone as a single emulsifier without (an)other emulsifier(s) or may be combined with (an)other emulsifier(s) to impact certain characteristics.

All or a portion of the emulsifier(s) can be admixed with the shortening component. The emulsifier typically comprises from about 1 to 20% of the lipid component. Generally useful as emulsifiers are partially esterified polyhydric compounds having surface-active properties. This class of emulsifiers includes among others mono- and diglycerides of fatty acids, organic acid esters of monoglycerides, and fatty acid esters. Mono- and diglycerides of fatty acids such as monostearin are commonly used emulsifiers. In some embodiments, they are added as distilled monoglycerides because of their improved purity and better functionality due to decreased interference from diglycerides. Another class of emulsifiers called phospholipids (e.g., lecithin) can also be used.

In some embodiments, a combination of emulsifiers as mentioned above is used to give the desirable emulsion stability and prevent phase separation between fat and water in the brownie batter, and the desirable textural attributes in the finished product.

In some embodiments, Sisterna SP70-C, a non-ionic surfactant sucrose stearate may be used. Being based on sucrose and vegetable fatty acids, sucrose esters are a unique class of natural, PEG-free, non-ionic emulsifiers capable of providing exceptional emulsification as well as improved softness of cooked batter.

In some embodiments, sucrose ester is added to the liquid phase substance at a concentration of between about 0.1 and 4.0% by weight of the liquid batter.

Additional Ingredients

The present compositions can optionally contain a variety of additional ingredients suitable for rendering such products more organoleptically acceptable, more nutritious and/or more storage stable. Such optional components may include lipids, colors, coloring agents, preservatives, acidity and pH modifiers (acids and alkaline). Of course, mixtures of the above-noted materials are contemplated herein.

The inventive batter compositions optionally include an edible fat source. A fat source can add richness to the eating properties of the finished baked or cooked goods. A fat source can also impact characteristics of the batter composition (such as processability and viscosity), as well as characteristics of the final baked or cooked good (such as texture). The fat source can have beneficial effects on the volume, grain, and texture of the final product, as well as the texture, mouthfeel and/or other organoleptic properties of the baked or cooked good.

Useful fat sources include shortenings and oils. Animal or vegetable based natural shortenings can also be used, as can synthetic shortenings or oils. Typical shortenings include fatty glycerides materials that can be classified on the basis of their physical state at room temperature. Solid shortenings are only useful in non flowable batters as they impact the fluidity of the liquid batter. In some embodiments, mixtures of liquid oils can be utilized.

The fatty glycerides can include vegetable or synthetic oil (such as sucrose polyesters) that is liquid at ordinary temperatures. Representative of such typical fat sources are palm oil, coconut oil, palm kernel oil, cottonseed oil, peanut oil, olive oil, sunflower seed oil, sesame seed oil, corn oil, safflower oil, poppy seed oil, soybean oil, canola (rapeseed) oil, and the like and combinations thereof. Mixtures of the oils described herein can be added to liquid batter, in an amount in the range of about 1.5% to about 25% of batter weight.

In case of manufacturing of non flowable batters, any solid shortening may be used. The solid lipid may be solid at room temperature. In some embodiments, the lipid has a melting point in the range of about 90 to 160° F.

A useful amount of total fat source in a batter composition of the present invention (from all sources) includes an amount that provides suitable properties such as organoleptic qualities and desired textural properties to the finished baked or cooked good. Such an amount can be up to about 25% of the batter composition in case of dense cakes or muffins, or in the range of about 1% to about 2% by weight for pancakes. For preparation of a lower fat baked or cooked good, the batter compositions can include total fat in an amount up to about 10%, or in the range of about 1% to about 10% by weight, based upon the total weight of the batter.

Encapsulated leavening source may add measurable amount of fat to the batter. Depending on using only encapsulated soda or with added encapsulated acidic leavening component, about 0.5 to 5% lipid may be contributed to the batter.

In certain embodiments, the batters provide finished baked goods that are low or even free of an added shortening ingredient (except from encapsulated ingredients). In those embodiments, shortening is either not included in the batter or used at levels only required to function as a carrier for the emulsifier ingredient described below, for instance, at about 0-5%, or about 0.05-3%, by weight of the batter.

Lipid sources may vary depending on the desired finished product. Oil and other plant sources, milk fat and animal sources may be utilized. The fat may contain varied amount of saturated and/or unsaturated fatty acids.

Optionally, the present batter products can include effective amounts of flavor(s). If present, such flavors can comprise effective amounts of flavors to provide desired flavor levels. Generally, flavors present at from about 0.01% to about 3% of the finished products are contemplated. Suitable non-nutritive sweeteners may also be used for sugar-free fictional foods. Example of non-nutritive sweeteners includes Sucralose, Aspartame, Saccharin and other high potency sweeteners. Suitable materials for use as nutritive carbohydrate sweetening agents are well known in the art. Examples of sweetening agents include both monosaccharide and disaccharide sugars such as sucrose, invert sugar, dextrose, lactose, honey, maltose, fructose, maple syrup and corn syrup or corn syrup solids. Example nutritive carbohydrate sweetening agents include those selected from the group consisting of sucrose, glucose, fructose, and corn syrup solids.

Batters for microwavable chocolate brownies or cakes are described herein and may comprise about 2 to 12% or about 4 to 9% cocoa. The cocoa used in this invention is either natural or "Dutched" chocolate from which a substantial portion of the fat or cocoa butter has been expressed or removed by solvent extraction, by pressing, or by other means. Cocoa suitable for use in the process of this invention may contain from 1 to 30% fatty constituents. Dutched chocolate is prepared by treating cocoa nibs with an alkali material such as potassium carbonate in a manner well known in the art. Generally, it tends to have a darker color and also can be more flavorful than natural cocoas. Chocolate can be used in practicing the process of this invention and it is intended, therefore, that chocolate, as described above, is to be encompassed by the term "cocoa".

In some embodiments, the present articles further comprise an antimycotic ingredient such as sodium, potassium sorbate, calcium propionate, parabens or fermentation byproducts as natural antimicrobial agents including lantibiotics, lacticin and similar materials. While not needed to maintain the safety of the batters during shelf stability, the addition of such antimycotic ingredients is desired from a standpoint of the physical integrity of the batter in case the consumer unitentionaly contaminate the batter with mold or yeast over multiple use of the final package. In some embodiments, the batter comprise an antimycotic ingredient at about 0.03 to 0.2% by weight of the batter.

In one aspect, the single serving size of the inventive batter or dough may comprise about one fluid ounce. Advantageously, batters in accordance with the invention do not require refrigeration and shelf stable for about 12 months without spoilage at ambient temperature.

The inventive batters or doughs may be, even though it is not required, dispensed into hermetically sealed packages for extended shelf life. Dispensing the compositions into hermetically sealed unit dose offers portability, rigidity, and formability. It also provides protection against moisture, gas and microbiological contamination extending the shelf life of unit dose even after opening the main package.

Alternatively, the batter can be particularly useful when contained in re-sealable or re-closable dispensing container or package. The container may contain headspace or may not. A package that does not contain headspace may be of a variable internal volume with the volume decreasing as batter contained in the package is removed from the package. For example, a container may be a re-sealable flexible, plastic pouch from which batter can be removed and the pouch re-sealed; as the batter is removed from the flexible package, the internal volume of the flexible package is reduced by the amount of the volume of the removed batter. Product dispensers such as plastic squeeze bottles (a.k.a., squeeze containers), are known for use in dispensing flowable products such as food products (e.g., syrups, ketchup, mustard, jelly, other condiments such as pickle relish). Such plastic squeeze bottles typically have a top and resilient sidewalls that together define an interior volume for containing the product until dispensed. A dispensing orifice typically extends through the top of the plastic squeeze bottle for passing the flowable product from the bottle. External pressure is usually applied to the resilient sidewalls of the plastic squeeze bottle to push the product to flow therefrom. After a portion of the batter is dispensed from a plastic squeeze bottle, releasing the pressure applied to the resilient sidewalls to allow the sidewalls to return to their original shape will draw air into the plastic container, filling headspace of the container ("headspace" is the portion of the interior volume that does not contain batter). Replacing the batter with ambient air can a reduce the shelf life of many food products, yet the batter described herein can exhibit extended storage stability even after air has been drawn into the container interior to replace batter that has been removed for use.

A packaged batter product kit, and method, are provided for delivering a single serve batter from a container such as a bowl or cup. A tray of diameter of about 2 to 16 inches filled with batter may be produced according to the current invention.

Additionally, the invention provides a food package kit comprising a batter composition and a topping or garnish in two separate compartment container suitable for delivering batters and additives. One compartment will contain the batter composition, whilst the second contains the topping or garnish. Before cooking or microwaving, the topping or garnish is added to the batter composition and then cooked or microwaved to provide inclusion of materials different than the batter throughout the batter compartment.

Moreover, in one application, the invention provides a food package kit comprising a batter composition and a syrup or frosting in two separate compartment container suitable for delivering batters and liquid additives. One compartment will contain the batter composition, whilst the second contains the liquid additives. After cooking or microwaving, the topping or garnish is added to the cooked batter composition to provide inclusion of materials different than the batter on top of the batter compartment.

Method of Preparation

The batter compositions can provide desirable baked or cooked products that are similar to those prepared either from scratch from conventional batters or from dry mixes. In some embodiments of the invention, the batter composition has an uncooked density in the range of about 0.8 g/cc (grams per cubic centimeter) to about 1.2 g/cc at ambient or refrigerated temperatures. As discussed herein, the inventive compositions can be utilized to prepare a wide variety of baked or cooked products; thus, one of skill in the art will readily appreciate that the uncooked density of the batter compositions can vary widely, depending upon the baked or cooked product to be prepared. The inventive batter compositions are typically useful for preparing products conventionally produced from chemically-leavened flour-based (farinaceous) batters. Baked or cooked products that can be prepared from the inventive batter compositions can include, for example, muffins, pancakes, brownies, cakes, coffee cakes, quick breads, corn breads, funnel cakes, and the like.

In further method aspects, the invention provides methods of formulating a batter composition comprising: providing a starch source comprising starch and low protein flour, combining the starch source with carbohydrate source, fat source, chemical leavening source, moisture source and reversible thermo-gelling source to provide a batter composition, wherein the chemical leavening source and reversible thermo-gelling source are added after pasteurization and cooling to about 60°-120° F. to provide a desired low viscosity batter composition that is ambient temperature stable and bakes to excellent quality finished bakery items.

The batters of the present invention are prepared by blending the components together in such a conventional manner as to produce a well-blended batter. In some embodiments of the invention, a preblend of the dry ingredients except for chemical leavening source and reversible thermo-gelling source is made. If employed, shortening is melted to form a liquid or liquid oil is used. Thereafter, the liquid ingredients (oil, water and emulsifiers) are combined to form a wet mixture or emulsion. The wet mixture and dry preblend are then combined to form a pre-batter. The pre-batter is heated to about 160° F. or less to inactivated microorganism, then cooled down to 80°-110° F. Then chemical leavening source and reversible thermo-gelling source are incorporated.

The batter can, for example, be prepared in a batch or a continuous mixing device. The batch mixers used can be a Stephan or a Tweedy mixer. A continuous mixer can be single or twin screw extruder. However, other types of batch or continuous mixers can be used also. The pasteurization and cooling steps could be performed as a batch processing or continuous HTST equipment.

In some embodiments, the invention includes the preparation of the altered-gelatinization starch source. After selecting the type and concentration of starch source, water and starch sources can be blended at the ratio of about 1:1 to 4:1, and a disaccharide ester can be added to alter the gelatinization temperature of the flour at about 160° F.

Turning to more of the details, lipid source could be prepared in advance. If a diversified triglyceride (which contains a mixture of naturally produced triglycerols) is desired, selected fat and or/oils are weighed and pre-blended at specified amounts. Lipid source may be blended at ambient temperature if it consists mainly of liquid oils or heated up to 150° F. if milk fat, cocoa butter or high melting point lipids are incorporated. Lipid source, carbohydrate source, emulsifier source, moisture source and other optional ingredients may be combined in a standard food mixing and processing vessel in any order of addition. Heating may be used for blending and mixing of various components. For instance, the admixture may be heated up to about 150°-170° F. for about 5-30 minutes and then cooled to about 50°-120° F. Any sequence of ingredients addition may be adopted before the incorporation of chemical leavening source and reversible thermo-gelling source. In one embodiment, water is added first to the processor. Next carbohydrate source is added with continuous agitation. Next lipid and emulsifier source are added. Then the water activity of the mix is adjusted to about 0.85 or below, about 0.65-0.85, or about 0.70-0.80.

In one embodiment, all ingredients except DCP HPMC, HMPC, sodium bicarbonate were mixed in a lab processor, heated to about 155°-175° F. for about 10-15 minutes, cooled down to about 50°-100° F., and the remaining ingredients were added and mixed in for about 10-20 minutes. Adding encapsulated soda at low temperature ensures that the encapsulation fat will not be melted releasing the sodium bicarbonate. Adding DCPD at ambient temperature appeared to delay forming initial small gas bubble in the batter and produced better properties in various batters. Furthermore, when HPMC is added to ambient temperature dough, lower viscosity dough was produced when compared to addition before heat treatment of about 155°-180° F. It is advantageous to synchronize ingredient addition with time and temperature of processing.

Pasteurization may be performed in a continuous flow pasteurizing apparatus, such that mixing is accomplished by introducing turbulence into the stream of the product at least periodically while it is being heated. Prior to the present invention pasteurization of a liquid mixture of batter was not possible, since an elevation of the temperature above 150° F. is necessary to eliminate all pathogenic and food-spoiling micro-organisms, such as bacteria, mold and/or yeast in the liquid mixture of batter caused the flour to swell and the batter to cook. Thus, in one embodiment of the invention the liquid mixture of batter is heated at a temperature of above 150° F., such as between 155°-165° F. and cooled to about 80°-100° F.

To obtain pasteurization of a food item the duration of the heat treatment can be crucial. The length of the heat treatment may depend on the type of food item in question. For example, a batter can be pasteurized at a temperature of 160°

F. for approximately 5 minutes in batch pasteurization. In some embodiments of the present invention the heat treatment is performed between 1 second to 2 minutes, alternatively, between 1-5 minutes using UHT equipment.

In some embodiments, the present liquid pasteurized batter is characterized by having a viscosity of 1,000-10,000 centipoise at 70° F. making it particularly suitable for cooking pancakes or cakes. Viscosity may be measured by a viscosity-meter such as a Brookfield viscosity-meter.

After adjusting the water activity to about 0.85 or lower, the entire mixture may be homogenized at about 1,500 psi (10 MPa) to 60,000 psi (410 MPa) as a single pass or multiple passes to produce homogenous batter. Conventional doughs cannot be homogenized because of the heavy mass.

In conventional home baking, gas production is encouraged at various stages of production to allow for dough or batter development and better handling, although it is advantageous to get most of the release during final baking. Since conventional home baking requires little to no hold times, gas production is not detrimental to shelf life of the dough or batter. In contrast, the inventive compositions and methods can eliminate any chemical leavening reaction during processing, filling and storage of batters or doughs, and avoid gas release until the final cooking or baking stage. As a result, the batters do not become unprocessable or difficult to fill, or cause bulging in their final packages or containers with the appearance of spoilage. The current invention helps protect leavening agents and delay their reactions until cooking or baking, providing pasteurized shelf stable batters that undergo chemical leavening when needed and can produce high quality cooked and baked items.

Existing processes attempt to produce products either containing pasteurized eggs (eggs does not provide proper leavening action) or avoid adding any leavening agents due to the technical challenges encountered during manufacturing ambient temperature shelf stable products. When chemical leavening agents are used, the batters are not pasteurized and have to be refrigerated or frozen until they are used. The current invention resolves the challenges associated with such processes by, for instance, the proper selection of either encapsulated or non-encapsulated ingredients, methods and/or times of adding ingredients, and proper processing temperature.

The resultant products may have a flowable consistency suitable for further filling into containers. The liquid batter at water activity of about 0.85 may be dispensed at a typical serving of about 20 to 100 ml.

The emulsion-matrix batter may be filled using any of the filling equipment known to those skilled in the art of packaging technology. Batter products may be filled into plastic, glass, synthetic material, paper or like containers or packages. Paper, PP, HDPE, CPET and similar resins may be utilized.

The final baking is conducted by the consumer. For instance, a cake batter could be baked in a conventional oven at a temperature of about 325° F. to 500° F. for about 5 to 15 minutes or in a microwave oven for about 20-80 seconds at high power. A cookie batter could also spread and show significant amount of rise during the microwave cooking step.

Baking time in a microwave oven depends on the thickness of the batter in the pan, with a longer bake time required for a thicker (higher) batter. Bake times range between about 20 to 45 seconds. For a fudgy brownie, bake times may be between about 30-50 seconds. For a more cake-like, a longer bake time is used, generally longer than 70 seconds. For pancakes and waffles, where cooking is conducted on a griddle or other hot surface, the desired or baking temperatures are typically about 375° F. Suitable baking temperatures will depend a great deal on the oven characteristics, the intermediate piece size and baking pan characteristics.

According to packaged batter products as described, the batters can be poured, ladled or optionally squeezed from a squeeze package onto a cooking surface. To be capable of being poured or squeezed from a squeeze container onto a cooking surface, the batter exhibits, in some embodiments, a sufficiently low viscosity that allows pouring or squeezing from a package. Upon depositing onto a cooking surface, the batter may spread to a desired dimension to yield a cooked product of desired size. In some embodiments, the viscosity level of a product is such that the product can be squeezed onto a cooking surface from a package and spread to a desired extent. In some embodiments, the viscosity level is below about 100, about 50, or about 20 Pascals-seconds.

Exemplary batters can also exhibit a relatively lower water activity level compared to some other batter compositions, including pancake batters freshly made from scratch or from a dry-mix, which generally exhibit a water activity in a range above about 0.96. A relatively low water activity reduces potential microbial activity storage duration. In general, the batter as described can have a water activity of about 0.85 or lower, e.g., about 0.82 or lower. If the water activity is higher, microbial stability over extended time periods may be reduced. If the water activity is lower, microbial stability under ambient temperatures may be satisfactory, but the amount of available water may be so low that the resulting cooked batter product may not have a high volume and fluffy texture and may be unacceptably dry.

The current composition and method produced stable batters suitable for storage and transport over a wide range of temperatures. In commercial transport, temperatures on trucks may get up to 150 F during summer time which will make packages bulge and unappealing.

EXAMPLES

This invention is further illustrated by the following examples, which are to be regarded as illustrative only, and in no way limit the scope of the invention. The following non-limiting examples and data illustrate various aspects and features relating to the method(s) and resulting products/compositions of this invention, including the surprising and unexpected modification, control and/or improvement of the water activity level, homogenization, emulsion formation, solubility of actives and improvement of energy level and mood elevation.

Example 1

This example illustrates the impact of adding various non-encapsulated acidic leavening agents to water at different temperatures on the water's pH. The acidic leavening agents were added at 2.7% to water (W/W). The pH readings were measured. Sodium aluminum phosphate (SALP), sodium acid pyrophosphate (SAPP), monocalcium phosphate monohydrate (MCP) and dicalcium phosphate dihydrate (DCPD) were added at ambient temperature and at 120, 160 and 180 F, cooled down, then pH measurements were taken at intervals of 10 minutes and 24 hours.

| Temperature | SALP | MCP | SAPP | DCPD |
|---|---|---|---|---|
| Ambient | 2.61 | 3.26 | 4.34 | 7.7 |
| Heated to 120 F. | 2.37 | 2.87 | 4.34 | 7.47 |
| Heated 120 F./after 24 hours | 2.43 | 2.88 | 4.28 | 7.5 |
| Heated to 160 F. | 2.21 | 2.67 | 4.31 | 6.89 |
| Heated 160 F./after 24 hours | 2.29 | 2.64 | 4.27 | 6.94 |
| pH 180 F. | 2.22 | 2.63 | 4.26 | 6.65 |
| pH 200 F. | 2.2 | 2.62 | 4.24 | 6.55 |

The results show that addition of SALP, MCP and SAPP depressed the pH to low levels that could negatively affect the quality of batter and react with the soda when added to a batter. DCPD provided the highest value of pH and the slowest release of acid over time and over extended exposure to heat This illustrates that DCPD is a suitable acidic leavening agent to be incorporated in shelf stable batters. The slow acid release feature is useful for delaying premature gas production and maintaining the quality of batters and doughs.

Example 2

A batter product was formulated as follows: 200 g glycerin, 300 g flour, 100 g sugar, and 398.2 g water were blended, heated to 160 F and cooled down to 70 F. 1.8 g encapsulated baking soda (50% fat) was then added. Acidic leavening agents were added at corresponding NV values. Batters where packaged in transparent 2 ounce containers and placed in incubators at 104 F and 130 F for up to 14 days to observe the impact of heat encountered during handling and transporting the batters under commercial conditions on various acidic leavening agents premature gas release. Numerical value was assigned to each treatment, where 0 indicates no gas production up to 10 which is the maximum value for gas production.

The following was observed:

| Parameter | SALP | MCP | SAPP | DCPD |
|---|---|---|---|---|
| Mixing/Bench Time/Baking | 22/9/69 | 25/22/53 | 28/8/64 | 0/0/100 |
| Neutralizing Value | 100% | 72% | 73% | 33% |
| Equivalent to 0.9% Bicarbonate | 0.9 | 1.25 | 1.25 | 2.7 |
| Pourability | Thick | Pourable | Semi-Thick | Pourable |
| Taste | Acidic | Acidic | Acidic | Typical |
| Gas Released at 104 F., 24 hours | 3 | 2 | 1 | 0 |
| Gas Released at 104 F., 14 days | 5 | 3 | 4 | 0 |
| Gas Released at 130 F., 24 hours | 4 | 3 | 3 | 0 |
| Gas Released at 130 F., 14 days | 7 | 5 | 7 | 0 |
| pH after manufacturing | 6.13 | 6.16 | 7.07 | 7.3 |
| pH after 24 hours | 6.23 | 6.28 | 7.03 | 6.98 |

DCPD produced the least amount of gas when compared with other agents and provided the highest pH value of batter and suitable pourability after 24 hours. The results show that even encapsulating soda to delay premature gas production did not significantly help slow down the gas release during accelerated storage. Under extended ambient storage, gas was noticed in SALP, MCP and SAPP.

Because DCPD has the lowest mixing/bench time values and the highest baking gas release value of any other acidic agents, the inventive method may employ DCDP solely to achieve the lowest acidity and the least gas production before cooking of batter.

Example 3

When the experiment of Example 2 was duplicated using 50% encapsulated acidic agents, the following results were obtained:

| Parameter | SALP | MCP | SAPP | DCPD |
|---|---|---|---|---|
| Mixing/Bench Time/Baking | 22/9/69 | 25/22/53 | 28/8/64 | 0/0/100 |
| Neutralizing Value | 100% | 72% | 73% | 33% |
| Equivalent to 0.9% Bicarbonate | 0.9 | 1.25 | 1.25 | 2.7 |
| Pourability | Thick | Pourable | Semi-Thick | Pourable |
| Taste | Acidic | Acidic | Acidic | Typical |
| Gas Released at 104 F., 24 hours | 2 | 1 | 1 | 0 |
| Gas Released at 104 F., 14 days | 4 | 2 | 3 | 0 |
| Gas Released at 130 F., 24 hours | 4 | 2 | 3 | 0 |
| Gas Released at 130 F., 14 days | 6 | 4 | 6 | 0 |
| pH after manufacturing | 6.13 | 6.16 | 7.07 | 7.3 |

It could be observed that encapsulation of acidic leavening agents reduced acid production, but not to an acceptable commercial level, and gas production occurred prematurely.

The above experiment was repeated using high melting point fat for microencapsulation at 70% fat and 30% active agents for both soda and acidic agents. Similar gas production results were obtained. The results suggest that even at high encapsulation fat ratio, water may seep through the layers of encapsulation and solubilize the actives, producing gas over time. One explanation of gas production could be that a thin layer of encapsulating fat was deposited at some surfaces due to the limitations and inconsistencies of the currently available encapsulation technologies.

It could be concluded from the above experiments that DCPD is a particularly useful agent for retarding premature gas production and providing pourable batters, whether it is encapsulated or not.

Example 4

Various types of ambient temperature shelf stable pasteurized batters and doughs were produced according to the teachings of the current invention. Sodium bicarbonate was developed to be of coarse particle size of about 50 to 200 micron and then encapsulated with high melting point fat of about 150-160 F. Fat encapsulation was compared at 30, 50 and 70% fat in the final particulates.

Products were formulated as follows:

| Ingredient/Batter Type | Pancakes | Brownie | Cake | Muffin |
|---|---|---|---|---|
| Flour | 27.0 | 22.0 | 28.0 | 40.0 |
| Corn Starch | 12.0 | 7.0 | 0.0 | 0.0 |
| Disaccharide Ester | 0.5 | 0.6 | 0.7 | 1.0 |
| Glycerin | 12.0 | 15.0 | 3.0 | 13.0 |
| Sugar | 10.0 | 8.0 | 20.0 | 11.0 |
| Salt | 0.6 | 0.5 | 1.1 | 1.0 |
| Potassium Sorbate | 0.2 | 0.1 | 0.2 | 0.1 |
| Canola Oil | 5.0 | 17.0 | 18.0 | 8.0 |
| Color | 0.0 | 0.1 | 0.0 | 0.1 |

-continued

| Ingredient/Batter Type | Pancakes | Brownie | Cake | Muffin |
|---|---|---|---|---|
| Flavorings | 3.0 | 8.0 | 2.5 | 2.8 |
| DCPD | 0.3 | 0.2 | 0.5 | 0.8 |
| Cellulose Gel | 1.0 | 1.2 | 1.3 | 2.0 |
| Sodium Bicarbonate (50% Encapsulation) | 0.4 | 0.2 | 0.8 | 0.6 |
| Water | 28.0 | 20.1 | 23.9 | 19.7 |

All ingredients except DCPD, Methocell F50, sodium bicarbonate were mixed in a lab processor, heated to about 155-185 F for about 10-15 minutes, cooled down to about 70-100 F, and the remaining ingredients were added and mixed in for about 10-20 minutes. Water activity were 0.845, 0.81, 0.79 and 0.75 respectively. Values for pH ranged between about 6.1 and 7.7. Viscosity measured at about 650 to 9,500 centipoise. The batters had a protein content of about 1.5-3.1% Batters were packaged in squeeze containers, flexible pouches and glass jars for shelf life stability and observation. Some gas production was observed at 104 F and 130 F over 24 hours, 1 and 2 weeks. Even though the formed gas was not at excessive amounts, it needed to be reduced further.

When various mesh and micron particle sizes were evaluated, the larger micron sizes produced fewer gas bubbles. Increasing the fat percentage in the encapsulation from 30 to 50 reduced bubble formation. The difference between 50 and 70% encapsulation was minimal.

Pancake batter was squeezed over a household griddle and cooked for about 2-6 minutes on 250 to 375 F setting. Judges rated the product as excellent and equivalent to freshly prepared pancakes.

Brownie, muffin and cake were squeezed into a cupcake (paper or silicone) cups as well as coffee mugs and microwaved at full power for about 30 to 75 seconds. Judges rated the products to be of good quality and properties.

The cake batter was also placed in a cake pan and baked in a conventional oven for about 10-15 minutes to produce a conventionally baked cake. Additionally, the brownie batter was baked in a conventional oven for about 8-14 minutes to produce a baked brownie. Furthermore, when the muffin batter was placed into a small personal size baking container, it produced acceptable quality muffin.

Example 5

Batters prepared in Example 4 were packaged in transparent 2 ounce containers and placed at ambient 104 F and 130 F for 14 days to observe the impact of heat encountered during handling and transporting the batters under commercial conditions in hot areas. Gas production was observed to be minimal.

Example 6

Various types of ambient temperature shelf stable pasteurized batters and doughs were produced according to the teachings of current invention. Sodium bicarbonate was developed to be of coarse particle size of about 500 to 1000 micron and then encapsulated with high melting point fat of about 150-160 F. Fat encapsulation was achieved at 50% fat in the final granules.

Products were formulated as follows:

| Ingredient/Batter Type | Pancakes | Brownie | Cake | Cookies |
|---|---|---|---|---|
| Flour | 28.0 | 22.0 | 22.0 | 45.0 |
| Starch | 6.0 | 7.0 | 8.0 | 0.0 |
| Disaccharide Ester | 0.1 | 0.5 | 0.7 | 3.0 |
| Glycerin | 13.0 | 16.0 | 10.0 | 0.0 |
| Sugar | 11.0 | 0.0 | 16.0 | 16.0 |
| Salt | 0.5 | 0.5 | 1.1 | 0.3 |
| Cultured Dextrose | 2.0 | 1.0 | 1.0 | 1.0 |
| Butter | 1.0 | 16.0 | 13.0 | 20.0 |
| Flavorings | 2.8 | 7.2 | 1.5 | 2.1 |
| DCPD (50% Encapsulation) | 3.1 | 1.2 | 1.3 | 0.6 |
| Thermo Reversible Cellulose | 1.0 | 1.0 | 0.5 | 3.0 |
| Sodium Bicarbonate (50% Encapsulation) | 3.2 | 1.0 | 1.3 | 0.6 |
| Water | 28.4 | 26.6 | 23.6 | 8.4 |

All ingredients except encapsulated DCPD, Methocell F50, sodium bicarbonate were mixed in a lab processor, heated to about 160-180 F for about 5-10 minutes, cooled down to about 80-90 F, and the remaining ingredients were added and mixed in for about 5 to 10 minutes. Batters were packaged in squeeze containers, flexible pouches and glass jars for shelf life stability and observation. No gas production was observed at ambient, 104 F and 130 F over 24 hours, 1 and 2 weeks and 1 to 12 month of accelerated storage study.

Brownie, cookies and cake were squeezed into a cupcake (paper or silicone) cups and microwaved at full power for about 25 to 60 seconds. Judges rated the products to be of good quality and properties.

About 100 g of a microwavable cake batter was placed in a thermoformed container and microwaved for about 60 seconds. The resultant cake is shown in FIG. 1.

Example 7

Figure 2:
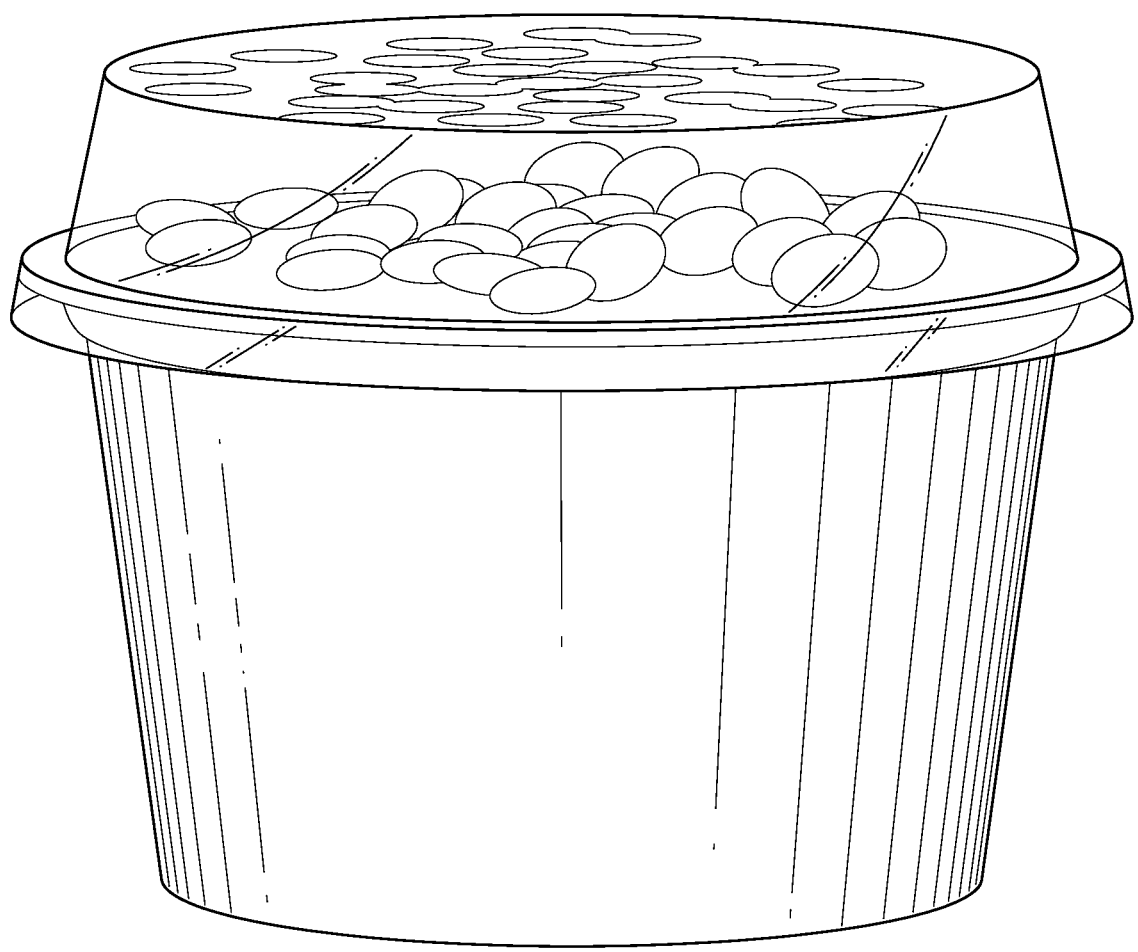
FIG. 2 illustrates a kit comprising cake batter and a topping, as described in Example 7.

About 80 grams of cake batter was filled into CPET compartment, then foil seal was applied. Polypropylene compartment or cup was filled with about 7-16 grams of selected candy pieces or garnish, then sealed with a foil lid. Both the bowl and top cup were combined to provide a kit of batter and topping in one unit as illustrated in FIG. 2.

Example 8

Figure 3:
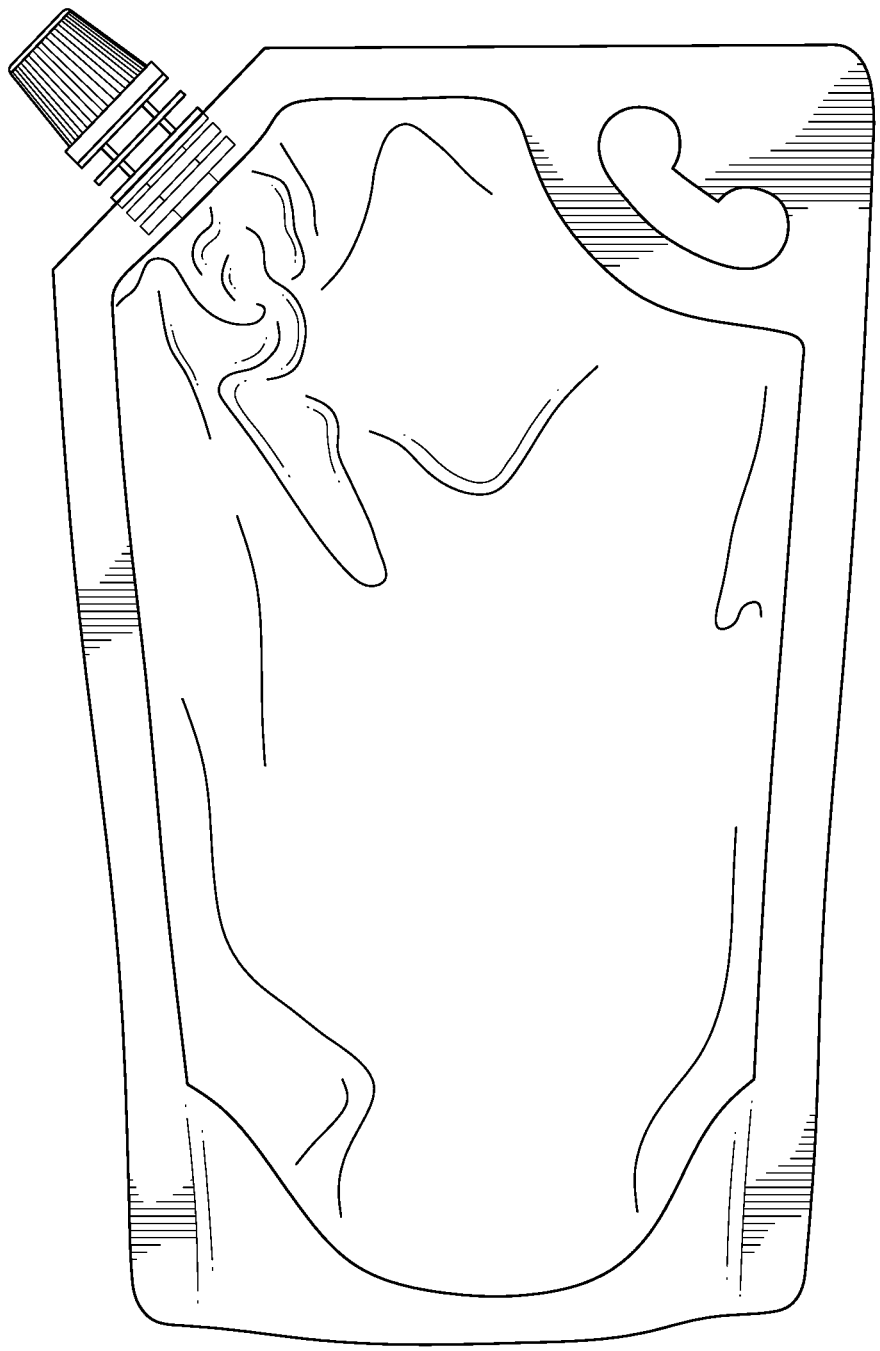
FIG. 3 illustrates a cake batter filled flexible pouch, as described in Example 8.

About 250 grams of cake batter was filled into a flexible pouch with closable spout as shown in FIG. 3.

It will be apparent to those skilled in the art that the disclosed subject matter may be directed to one or more of the above- and below-indicated embodiments in any combination, and changes may be made and equivalents may be substituted without departing from the spirit and scope of the invention. Hence, the description and examples should not be construed as limiting the scope of the invention. All references, publications, patents, and patent applications disclosed herein are hereby incorporated by reference in their entirety as if each had been individually incorporated.

Specific Embodiments

1. A shelf stable batter comprising an effective amount of a heat-activated leavening source that is stable at ambient temperature with leavening activity activated only at temperatures of about 160° F. and higher.
2. The batter of embodiment 1, wherein the leavening source constitutes about 1-6% by weight of the batter.

3. The batter of embodiment 1, wherein the leavening source constitutes about 4-6% by weight of the batter.

4. The batter of embodiment 1, wherein the leavening source constitutes about 0.4-3% by weight of the batter.

5. The batter of any one of embodiments 1-4, wherein the leavening source comprises a chemical leavening acid and a chemical leavening base.

6. The batter of any one of embodiments 1-5, wherein the chemical leavening acid is non-encapsulated.

7. The batter of any one of embodiments 1-5, wherein the chemical leavening acid is encapsulated.

8. The batter of embodiment 7, wherein the chemical leavening acid is lipid encapsulated.

9. The batter of any one of embodiments 1-5, wherein the leavening source comprises dicalcium phosphate dihydrate (DCPD).

10. The batter of any one of embodiments 1-5, wherein the leavening source consists essentially of DCPD.

11. The batter of any one of embodiments 1-5, wherein the DCPD is encapsulated.

12. The batter of any one of embodiments 1-5, wherein the DCPD is lipid encapsulated.

13. The batter of any one of embodiments 1-5, wherein the leavening source consists essentially of DCPD.

14. The batter of embodiment 13, wherein the DCPD is encapsulated.

15. The batter of embodiment 13, wherein the DCPD is lipid encapsulated.

16. The batter of any one of embodiments 1-15, further comprising an effective amount of an additional chemical leavening source.

17. The batter of embodiment 16, wherein the additional chemical leavening source comprises a chemical leavening base.

18. The batter of any one of embodiments 5 and 17, wherein the chemical leavening base is selected from sodium bicarbonate, ammonium carbonate, ammonium bicarbonate, and potassium bicarbonate.

19. The batter of embodiment 18, wherein the chemical leavening base is sodium bicarbonate.

20. The batter of any one of embodiments 5 and 17-19, wherein the chemical leavening base is encapsulated.

21. The batter of embodiment 20, wherein the chemical leavening base is lipid encapsulated.

22. The batter of embodiment 21, wherein the lipid encapsulated chemical leavening base comprises about 50-70% by weight lipid.

23. The batter of embodiment 21, wherein the lipid encapsulated chemical leavening base comprises about 70% by weight lipid.

24. The batter of any one of embodiments 20-23, wherein the encapsulated chemical leavening base has an encapsulation activity of about 10-50%.

25. The batter of any one of embodiments 20-24, wherein the encapsulated chemical leavening base has a particle size of about 100-1,000 micron.

26. The batter of any one of embodiments 20-24, wherein the encapsulated chemical leavening base has a particle size of about 28-150 mesh.

27. The batter of any one of embodiments 20-26, wherein the encapsulated chemical leavening base constitutes about 0.5-5% by weight of the batter.

28. The batter of any one of embodiments 1-27, further comprising an effective amount of an emulsifier source.

29. The batter of embodiment 28, wherein the emulsifier source constitutes up to about 4% by weight of the batter.

30. The batter of embodiment 28, wherein the emulsifier source constitutes about 0.05-3% by weight of the batter.

31. The batter of embodiment 28, wherein the emulsifier source constitutes about 0.1-2% by weight of the batter.

32. The batter of any one of embodiments 28-31, wherein the emulsifier source comprises a fatty acid or fatty acid ester.

33. The batter of any one of embodiments 28-31, wherein the emulsifier source is selected from mono- and diglycerides of fatty acids and phospholipids.

34. The batter of any one of embodiments 28-31, wherein the emulsifier source comprises a disaccharide ester.

35. The batter of any one of embodiments 28-31, wherein the emulsifier source comprises a sucrose ester.

36. The batter of embodiment 35, wherein the sucrose ester is Sisterna SP70-C.

37. The batter of any one of embodiments 28-36, wherein the emulsifier source is admixed with a shortening to form a mixture.

38. The batter of embodiment 37, wherein the emulsifier source constitutes about 1-20% by weight of the shortening-emulsifier source mixture.

39. The batter of any one of embodiments 1-38, further comprising an effective amount of a setting agent.

40. The batter of embodiment 39, wherein the setting agent is a reversible thermo-gelling source.

41. The batter of embodiment 40, wherein the reversible thermo-gelling source constitutes about 1-3% by weight of the batter.

42. The batter of any one of embodiments 40 and 41, wherein the reversible thermo-gelling source comprises hydroxypropyl methyl cellulose (HPMC).

43. The batter of embodiment 42, wherein the HPMC is Methylcellulose F50.

44. The batter of any one of embodiments 1-43, further comprising an effective amount of a starch source.

45. The batter of embodiment 44, wherein the starch source constitutes about 45% or less by weight of the batter.

46. The batter of embodiment 44, wherein the starch source constitutes about 20-30% by weight of the batter.

47. The batter of any one of embodiments 44-46, wherein the starch source comprises altered gelatinization starch.

48. The batter of any one of embodiments 44-47, wherein the starch source comprises flour having a protein content of about 7-10% by weight of the flour.

49. The batter of any one of embodiments 44-47, wherein the starch source comprises flour having a protein content of about 8-9% by weight of the flour.

50. The batter of any one of embodiments 44-47, wherein the starch source comprises flour having a protein content of about 1.5-3.1% by weight of the flour.

51. The batter of any one of embodiments 48-50, wherein the flour is soft wheat flour.

52. The batter of any one of embodiments 48-50, wherein the flour is selected from cake flour, pastry flour, and all-purpose flour.

53. The batter of any one of embodiments 48-52, wherein the flour is enzyme-inactivated flour.

54. The batter of any one of embodiments 44-53, wherein the starch source further comprises a native starch.

55. The batter of embodiment 54, wherein the native starch constitutes at least about 30% by weight of the starch source.

56. The batter of embodiment 54, wherein the native starch constitutes at least about 75% by weight of the starch source.
57. The batter of embodiment 54, wherein the native starch constitutes at least about 80% by weight of the starch source.
58. The batter of any one of embodiments 54-57, wherein the native starch is selected from wheat starch, corn starch, potato starch, sweet potato starch, tapioca starch, and combinations thereof.
59. The batter of embodiment 58, wherein the native starch is corn starch.
60. The batter of any one of embodiments 44-59, wherein the starch source further comprises a modified starch.
61. The batter of embodiment 60, wherein the modified starch constitutes about 15% or less by weight of the starch source.
62. The batter of embodiment 60, wherein the modified starch constitutes about 10% or less by weight of the starch source.
63. The batter of embodiment 60, wherein the modified starch constitutes about 5% or less by weight of the starch source.
64. The batter of any one of embodiments 44-63, wherein the starch source has a gelatinization temperature of about 165° F. or higher.
65. The batter of any one of embodiments 1-64, further comprising an effective amount of a carbohydrate source.
66. The batter of embodiment 65, wherein the carbohydrate source constitutes about 5-26% by weight of the batter.
67. The batter of embodiment 65, wherein the carbohydrate source constitutes about 10-15% by weight of the batter.
68. The batter of any one of embodiments 65-67, wherein the carbohydrate source comprises a sugar alcohol.
69. The batter of embodiment 68, wherein the sugar alcohol is glycerin.
70. The batter of any one of embodiments 1-69, further comprising an effective amount of a lipid source.
71. The batter of embodiment 70, wherein the lipid source constitutes up to about 25% by weight of the batter.
72. The batter of embodiment 70, wherein the lipid source constitutes up to about 15% by weight of the batter.
73. The batter of embodiment 70, wherein the lipid source constitutes up to about 10% by weight of the batter.
74. The batter of embodiments 70, wherein the lipid source constitutes up to about 1.0% by weight of the batter.
75. The batter of any one of embodiments 70-74, wherein the lipid source comprises a solid shortening.
76. The batter of embodiment 75, wherein the solid shortening has a melting point of about 90°-160° F.
77. The batter of any one of embodiments 70-76, wherein the lipid source comprises a liquid oil.
78. The batter of embodiment 77, wherein the liquid oil is a vegetable or synthetic oil.
79. The batter of any one of embodiments 1-78, further comprising an effective amount of a moisture source.
80. The batter of embodiment 79, wherein the moisture source constitutes about 8.0-30.0% by weight of the batter.
81. The batter of any one of embodiments 79 and 80, wherein the moisture source is water.
82. The batter of any one of embodiments 79-81, wherein the batter has a water activity of about 0.85 $A_w$ or lower.
83. The batter of any one of embodiments 79-81, wherein the batter has a water activity of about 0.65-0.85 $A_w$.
84. The batter of any one of embodiments 79-81, wherein the batter has a water activity of about 0.70-0.85 $A_w$.
85. The batter of any one of embodiments 79-84, wherein the batter has a viscosity of about 1,000-20,000 centipoise.
86. The batter of any one of embodiments 79-84, wherein the batter has a viscosity of about 1,000-10,000 centipoise.
87. The batter of any one of embodiments 79-84, wherein the batter has a viscosity of about 650-6,000 centipoise.
88. The batter of any one of embodiments 79-84, wherein the batter has a viscosity of about 7,000-20,000 centipoise.
89. The batter of any one of embodiments 79-84, wherein the batter is shelf stable for at least about 6 months.
90. The batter of any one of embodiments 1-89, wherein the batter is shelf stable for at least about 12 months.
91. The batter of any one of embodiments 1-90, wherein the batter is shelf stable in temperatures of up to about 150° F.
92. The batter of any one of embodiments 1-91, wherein the batter is suitable for cooking in a microwave oven, in a conventional oven, or on a hot surface.
93. The batter of any one of embodiments 1-92, wherein the batter is substantially free from egg or egg product.
94. The batter of any one of embodiments 1-93, wherein the batter has a pH of about 6.5-8.0.
95. The batter of any one of embodiments 1-93, wherein the batter has a pH of about 6.5-7.5.
96. The batter of any one of embodiments 1-93, wherein the batter has a pH of about 7.0.
97. The batter of any one of embodiments 1-96, wherein the batter is heat treated to about 160-200° F.
98. The batter of any one of embodiments 1-97, wherein the batter has a density of about 0.8-1.3 g/cc at ambient or lower temperatures.
99. The batter of any one of embodiments 1-98, wherein the leavening source comprises lipid encapsulated DCPD and lipid encapsulated sodium bicarbonate, wherein the lipid encapsulated sodium bicarbonate has a particle size of about 100-1,000 micron or about 28-150 mesh.
100. The batter of embodiment 99, further comprising an effective amount of a starch source, wherein the starch source comprises flour having a protein content of about 7-10% by weight of the flour.
101. The batter of any one of embodiments 99 and 100, further comprising an encapsulated chemical leavening source and a lipid source, wherein the encapsulated leavening source constitutes about 1-6% by weight of the batter, and the lipid source constitutes up to about 5% by weight of the batter.
102. The batter of any one of embodiments 99-101, further comprising HPMC.
103. The batter of any one of embodiments 99-101, further comprising sucrose ester.
104. A method of preparing a batter, comprising:
   combining a starch source with a moisture source to yield a mixture,
   pasteurizing the mixture to yield a pasteurized mixture,
   cooling the pasteurized mixture to a temperature of about 120° F. or lower, and
   adding a leavening source to the starch source and the moisture source after the pasteurizing and cooling steps, wherein the leavening source's leavening activity is activated only at temperatures of about 160° F. and higher.

105. The method of embodiment 104, further comprising adding a reversible thermo-gelling source to the starch source and the moisture source after the pasteurizing and cooling steps.

106. The method of any one of embodiments 104 and 105, further comprising combining the starch source and the moisture source with a carbohydrate source before the pasteurizing and cooling steps.

107. The method of any one of embodiments 104-106, further comprising combining the starch source and the moisture source with a lipid source before the pasteurizing and cooling steps.

108. The method of any one of embodiments 104-107, further comprising combining the starch source and the moisture source with an emulsifier source before the pasteurizing and cooling steps.

109. The method of any one of embodiments 104-108, wherein the combining step(s) is/are performed at ambient temperature.

110. The method of any one of embodiments 104-109, where the pasteurizing step comprises heating to a temperature of 150° F. or higher.

111. The method of any one of embodiments 104-109, where the pasteurizing step comprises heating to a temperature of 155° F. or higher.

112. The method of any one of embodiments 104-109, where the pasteurizing step comprises heating to a temperature of up to about 195° F.

113. The method of any one of embodiments 104-109, where the pasteurizing step comprises heating to a temperature of up to about 170° F.

114. The method of any one of embodiments 104-109, where the pasteurizing step comprises heating to a temperature of up to about 160° F.

115. The method of any one of embodiments 104-109, where the pasteurizing step comprises heating to a temperature of about 150°-170° F.

116. The method of any one of embodiments 104-109, where the pasteurizing step comprises heating to a temperature of about 150°-160° F.

117. The method of any one of embodiments 104-116, wherein the heating continues for about 5-30 minutes.

118. The method of any one of embodiments 104-116, wherein the heating continues for about 10-15 minutes.

119. The method of any one of embodiments 104-118, wherein the cooling step comprises cooling to a temperature of about 120° F. or lower.

120. The method of any one of embodiments 104-118, wherein the cooling step comprises cooling to a temperature of about 80°-110° F.

121. The method of any one of embodiments 104-118, wherein the cooling step comprises cooling to a temperature of about 90°-100° F.

122. The method of any one of embodiments 104-121, wherein the pasteurizing step is performed in a continuous flow pasteurizing apparatus.

123. The method of any one of embodiments 104-121, wherein the pasteurizing step is performed using ultra-high temperature (UHT) equipment.

124. The method of any one of embodiments 104-123, wherein the starch source is as described in any of the previous embodiments.

125. The method of any one of embodiments 104-124, wherein the moisture source is as described in any of the previous embodiments.

126. The method of any one of embodiments 104-125, wherein the leavening source is as described in any of the previous embodiments.

127. The method of any one of embodiments 104-126, wherein the thermo-gelling source is as described in any of the previous embodiments.

128. The method of any one of embodiments 104-127, wherein the lipid source is as described in any of the previous embodiments.

129. The method of any one of embodiments 104-128, wherein the emulsifier source is as described in any of the previous embodiments.

130. The method of any one of embodiments 104-129, further comprising adjusting the water activity of the pasteurized mixture to about 0.85 or lower.

131. The method of any one of embodiments 104-130, wherein the moisture source and the starch source are present at a weight ratio of about 4:1 to about 3:1.

132. A product prepared by the method of any one of embodiments 104-131.

133. A food package kit comprising the batter of any one of embodiments 1-103, and a container suitable for delivering the batter.

134. The food package kit of embodiment 133, wherein the container comprises at least two compartments, with one compartment containing the batter, and a second compartment containing a food additive.

135. The food package kit of embodiment 134, wherein the food additive is selected from toppings, garnishes, syrups, and frostings.

What is claimed is:

1. A shelf stable pasteurized batter comprising a moisture source, a carbohydrate source, a leavening source, an emulsifier source; wherein the moisture source constitutes of said batter is about 20-39% by weight of the batter; wherein the leavening sources are acidic dicalcium phosphate dihydrate (DCPD) and basic leavening source; wherein the leavening sources of said batter are encapsulated.

2. The batter of claim 1, wherein the carbohydrate source is a starch.

3. The batter of claim 1, wherein the basic leavening base is sodium bicarbonate.

4. The batter of claim 1, wherein the leavening sources are lipid encapsulated.

5. The batter of claim 4, wherein the lipid encapsulated leavening source comprises about 50-70% by weight lipid.

6. The batter of claim 5, wherein the encapsulated chemical leavening source has a particle size of about 100-1,000 micron or about 28-150 mesh.

7. The batter of claim 6, wherein the encapsulated chemical leavening source constitutes about 0.2-5% by weight of the batter.

8. The batter of claim 7, further comprising an emulsifier source.

9. The batter of claim 8, wherein the emulsifier source constitutes up to about 4% by weight of the batter.

10. The batter of claim 9, wherein the emulsifier source comprises a sucrose ester.

11. The batter of claim 10, further comprising a starch source.

12. The batter of claim 11, wherein the starch source constitutes up to about 45% by weight of the batter.

13. The batter of claim 12, wherein the starch source comprises altered gelatinization starch.

14. The batter of claim 13, wherein the altered gelatinization starch has a gelatinization temperature of about 150° F.-165° F. or higher.

15. The batter of claim 13, wherein the starch source comprises flour having a protein content of about 7-10% by weight of the flour.

16. The batter of claim 15, wherein the starch source further comprises a native starch.

17. The batter of claim 16, wherein the native starch constitutes at least about 30% by weight of the starch source.

18. The batter of claim 17, wherein the native starch is corn starch.

19. The batter of claim 18, wherein the starch source further comprises a modified starch.

20. The batter of claim 1, wherein the batter has a density of about 0.8-1.3 g/cc at ambient or lower temperatures.

21. A food package kit comprising the batter of claim 1, and a container suitable for delivering the batter.

22. The batter of claim 1 further comprising a heat setting source.

23. The batter of claim 22, further comprising a reversible thermo-gelling source.

24. The batter of claim 23, wherein the reversible thermo-gelling source constitutes about 0.5-3% by weight of the batter.

25. The batter of claim 24, wherein the reversible thermo-gelling source is hydroxypropyl methyl cellulose (HPMC).

26. The batter of claim 25, wherein the HPMC is a hydroxypropyl methylcellulose with medium substitution hydrates in temperatures less than 77° F. without a significant increase in viscosity, gels between 140°-160° F., and melts below 95° F.

27. The batter of claim 26, further comprising a carbohydrate source.

28. The batter of claim 27, wherein the carbohydrate source constitutes about 5-25% by weight of the batter.

29. The batter of claim 28, wherein the carbohydrate source is a sugar alcohol.

30. The batter of claim 29, wherein the sugar alcohol is glycerin.

31. The batter of claim 30, further comprising a lipid source.

32. The batter of claim 31, wherein the lipid source comprises a liquid oil.

33. The batter of claim 32, further comprising a moisture source.

34. The batter claim 33, wherein the batter has a water activity of about 0.85 Aw or lower.

35. The batter of claim 33, wherein the batter has a water activity of about 0.65-0.85 Aw.

36. The batter of claim 33, wherein the batter has a water activity of about 0.70-0.85 Aw.

37. The batter of claim 36, wherein the batter has a viscosity of about 1,000-20,000 centipoise.

38. The batter of claim 36, wherein the batter has a viscosity of about 700-10,000 centipoise.

39. The batter of claim 38, wherein the batter is shelf stable for at least about 12 months.

40. The batter of claim 39, wherein the batter is shelf stable in temperatures of up to about 150° F.

41. The batter of claim 40, wherein the batter is suitable for cooking in a microwave oven, in a conventional oven, or on a hot surface.

42. The batter of claim 41, wherein the batter is free from egg or egg product.

43. The batter of claim 42, wherein the batter has a pH of about 6.5-8.0.

44. The batter of claim 22, wherein the heat setting source is a protein; wherein said protein is independently selected from the group consisting of caseinate, an albumin, whey protein concentrate, a nonfat dry milk, buttermilk, and a combination thereof.

45. The batter of claim 31, wherein the lipid source constitutes up to about 25% by weight of the batter.

46. The batter of claim 45, wherein the lipid source comprises a solid shortening having a melting point of about 90°-160° F.

* * * * *